United States Patent
Lyon

(10) Patent No.: US 7,441,092 B2
(45) Date of Patent: Oct. 21, 2008

(54) MULTI-CLIENT CLUSTER-BASED BACKUP AND RESTORE

(75) Inventor: James M. Lyon, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 337 days.

(21) Appl. No.: 11/407,798

(22) Filed: Apr. 20, 2006

(65) Prior Publication Data

US 2007/0250671 A1  Oct. 25, 2007

(51) Int. Cl.
G06F 12/16 (2006.01)
(52) U.S. Cl. .................................. 711/162; 707/204
(58) Field of Classification Search .............. 711/161, 711/162, 216; 707/204
See application file for complete search history.

(56) References Cited

U.S. PATENT DOCUMENTS

| | | | |
|---|---|---|---|
| 5,193,207 A | | 3/1993 | Vander Vegt et al. |
| 5,901,182 A | | 5/1999 | Kot |
| 6,105,024 A | | 8/2000 | Graefe et al. |
| 6,519,593 B1 | | 2/2003 | Matias et al. |
| 6,738,769 B2 | | 5/2004 | Sharp |
| 6,785,786 B1 | | 8/2004 | Gold et al. |
| 6,789,156 B1 * | | 9/2004 | Waldspurger ............... 711/6 |
| 7,245,596 B2 * | | 7/2007 | Cooley et al. ............ 370/329 |
| 7,257,257 B2 * | | 8/2007 | Anderson et al. ......... 382/187 |
| 2003/0212985 A1 | | 11/2003 | Chan et al. |
| 2004/0236803 A1 * | | 11/2004 | Spiegeleer ................ 707/204 |
| 2005/0091460 A1 | | 4/2005 | Rotithor et al. |
| 2005/0251693 A1 | | 11/2005 | Shevchenko |
| 2006/0224846 A1 * | | 10/2006 | Amarendran et al. ...... 711/162 |
| 2006/0230244 A1 * | | 10/2006 | Amarendran et al. ...... 711/162 |
| 2006/0235908 A1 * | | 10/2006 | Armangau et al. ........ 707/204 |
| 2007/0100913 A1 * | | 5/2007 | Sumner et al. ............ 707/204 |
| 2007/0266062 A1 * | | 11/2007 | Young ..................... 707/204 |

OTHER PUBLICATIONS

J.S. Vitter "External memory algorithms and data structures: dealing with massive data", ACM Computing Surveys (CSUR), vol. 33, Issue 2, Jun. 2001, pp. 209-271.
Rafiqul Islam et al., "A new external sorting algorithm with no additional disk space", Information Processing Letters, vol. 86, Issue 5, Jun. 2003, pp. 229-233.
C. Nyberg et al., "AlphaSort: a cache-sensitive parallel external sort", VLDN Journal 4 (4), 1995, pp. 603-627.
Net Integration Technologies Inc., "Intelligent disk backup", retrieved from http://www.nitix.com/technologies/technologies_idb.php on Dec. 23, 2005.
Veritas Software Corp. and Network Appliance Inc., "Optimizing Data Protection with Veritas and Network Appliance", Copyright 2005, http://www.netapp.com/ftp/vrts-data-protection.pdf.

* cited by examiner

Primary Examiner—Jack A Lane

(57) ABSTRACT

Backup and restore technology comprising a backup engine, one or more client backup modules coupled to the backup engine via a backup protocol, and a backup database coupled to the backup engine, the backup database including a set of clusters, the set of clusters forming one or more backups, wherein each cluster of the set of clusters is unique such that single-instance storage across clients is achieved.

12 Claims, 35 Drawing Sheets

Phase 1

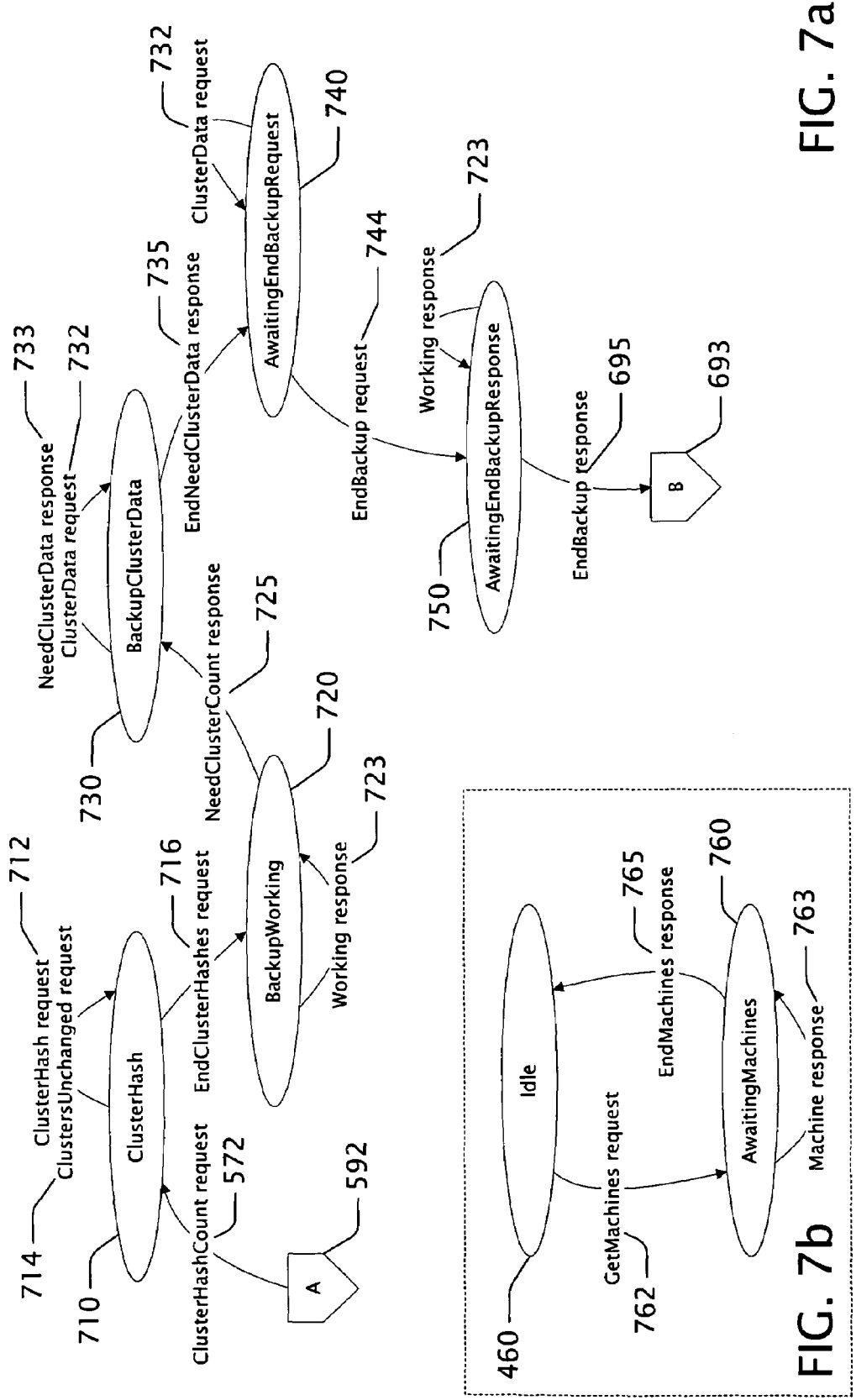

```
<File Type="Commit">
    <Header>                                              — 1910
        <Field Type="boolean" Name="Committed" />         — 1911
    </Header>
    <Record>                                              — 1920
        <Field Type="string" Name="FileName" />           — 1921
        <Field Type="int" Name="StreamIndex" />           — 1922
    </Record>
    <Sentinel>
        <Field Type="string" Value="" />
    </Sentinel>
</File>
```

```
<File Type="Control">
    <Header>
        <Field Type="int" Name="BytesPerCluster" />
        <Field Type="int" Name="NextIndex" />
        <Field Type="int" Name="NextDataOffset" />
    </Header>
</File>
```

2010 — `<File Type="Control">`
2011 — `<Field Type="int" Name="BytesPerCluster" />`
2012 — `<Field Type="int" Name="NextIndex" />`
2013 — `<Field Type="int" Name="NextDataOffset" />`

FIG. 21

```
<File Type="Machines">
    <Header />
    <Record>
        <Field Type="fixedbinary" Length="16" Name="MachineGuid" />
        <Field Type="string" Name="MachineName" />
        <Field Type="string" Name="Description" />
        <Field Type="string" Name="FileName" />
        <Field Type="int" Name="Timestamp" />
        <Field Type="int" Name="ScheduleDays" />
        <Field Type="int" Name="ScheduleMinutes" />
        <Field Type="fixedbinary" Length="6" Name="MacAddress" />
    </Record>
    <Sentinel>
        <Field Type="fixedbinary" Value="00000000000000000000000000000000" />
    </Sentinel>
</File>
```

2110 — <Record>
2111 — MachineGuid field
2112 — ScheduleDays field
2113 — ScheduleMinutes field
2114 — MacAddress field

```
<File Type="VolumeConfig">
    <Header>
        <Field Type="fixedbinary" Length="16" Name="MachineGuid" />
    </Header>
    <Record>
        <Field Type="varbinary" Name="UniqueId" />
        <Field Type="string" Name="FriendlyName" />
        <Field Type="string" Name="FileName" />
        <Field Type="int" Name="PresentTimestamp" />
        <Field Type="int" Name="BackupTimestamp" />
        <Field Type="int" Name="VolumeBytes" />
    </Record>
    <Sentinel>
        <Field Type="varbinary" Value="" />
    </Sentinel>
</File>
```

2210 — <Header>
2211 — <Field Type="fixedbinary" ...
2220 — <Record>

FIG. 22

```
<File Type="BackupSet">
    <Header>
        <Field Type="fixedbinary" Length="16" Name="MachineGuid" />
    </Header>
    <Record>
        <Field Type="int" Name="Index" />
        <Field Type="int" Name="Timestamp" />
        <Field Type="boolean" Name="IsComplete" />
        <Field Type="boolean" Name="IsDaily" />
        <Field Type="boolean" Name="IsWeekly" />
        <Field Type="boolean" Name="IsMonthly" />
        <Field Type="boolean" Name="IsYearly" />
        <Field Type="int" Name="VolumeCount" />
        <Field Type="string" Occurs="VolumeCount" Name="VolumeName" />
    </Record>
    <Sentinel>
        <Field Type="int" Value="0" />
    </Sentinel>
</File>
```

2310 — `<File Type="BackupSet">` / `<Header>`
2311 — `<Field Type="fixedbinary" ...>`
2320 — `<Record>`

```
<File Type="GlobalCluster">
    <Header>
        <Field Type="int" Name="BytesPerCluster" />
    </Header>
    <Record>
        <Field Type="fixedbinary" Length="16" Name="Hash" />
        <Field Type="int" Name="DataIndex" />
    </Record>
    <Sentinel>
        <Field Type="fixedbinary" Length="16" Value="ffffffffffffffffffffffffffffffff" />
    </Sentinel>
</File>
```

2410 — <File Type="GlobalCluster">
2411 — <Field Type="int" Name="BytesPerCluster" />
2420 — <Record>
2421 — <Field Type="fixedbinary" Length="16" Name="Hash" />
2422 — <Field Type="int" Name="DataIndex" />

FIG. 25

```
<File Type="GlobalClusterLatest">
    <Header>
        <Field Type="int" Name="BytesPerCluster" />
        <Field Type="fixedbinary" Length="16" Name="MachineGuid" />
        <Field Type="varbinary" Name="UniqueId" />
        <Field Type="string" Name="MachineFile" />
        <Field Type="string" Name="VolumeFile" />
        <Field Type="int" Name="BackupSetIndex" />
    </Header>
    <Record>
        <Field Type="fixedbinary" Length="16" Name="Hash" />
        <Field Type="int" Name="DataIndex" />
    </Record>
    <Sentinel>
        <Field Type="fixedbinary" Length="16" Value="ffffffffffffffffffffffffffffffff" />
    </Sentinel>
</File>
```

2510 — `<File Type="GlobalClusterLatest">`
2511 — `<Field Type="int" Name="BytesPerCluster" />`
2520 — `<Record>`
2521 — `<Field Type="fixedbinary" Length="16" Name="Hash" />`
2522 — `<Field Type="int" Name="DataIndex" />`

FIG. 26

```
<File Type="Index">
    <Header>
        <Field Type="int" Name="BytesPerCluster" />
    </Header>
    <Record>
        <Field Type="int" Name="ByteOffset" />
    </Record>
</File>
```

2610 — `<File Type="Index">`
2611 — `<Field Type="int" Name="BytesPerCluster" />`
2620 — `<Record>`
2621 — `<Field Type="int" Name="ByteOffset" />`

FIG. 27

```
<File Type="Data">
    <Header>
        <Field Type="int" Name="BytesPerCluster" />
    </Header>
    <Record>
        <Field Type="varbinary" Name="ClusterData" />
    </Record>
</File>
```

2710 — <File Type="Data">
2710 — <Field Type="int" Name="BytesPerCluster" />
2720 — <Record>
2721 — <Field Type="varbinary" Name="ClusterData" />

```
<File Type="Volume">
    <Header>
        <Field Type="fixedbinary" Length="16" Name="MachineGuid" />
        <Field Type="varbinary" Name="UniqueId" />
    </Header>
    <Record>
        <Field Type="int" Name="BackupSetIndex" />
        <Field Type="int" Name="Version" />
        <Field Type="string" Name="FileSystem" />
        <Field Type="int" Name="VolumeSerialNumber" />
        <Field Type="int" Name="BytesPerSector" />
        <Field Type="int" Name="BytesPerCluster" />
        <Field Type="int" Name="OriginalVolumeBytes" />
        <Field Type="int" Name="MinimumRestoreBytes" />
        <Field Type="int" Name="ClusterCount" />
        <Field Type="int" Name="ChangedClusterCount" />
        <Field Type="int" Name="HashesReceivedCount" />
        <Field Type="int" Name="NewClusterCount" />
        <Field Type="varbinary" Name="ClientInfo" />
    </Record>
    <Sentinel>
        <Field Type="int" Value="0" />
    </Sentinel>
</File>
```

- 110 → `<Header>`
- 111 → `<Field Type="fixedbinary" Length="16" Name="MachineGuid" />`
- 112 → `<Field Type="varbinary" Name="UniqueId" />`
- 120 → `<Record>`
- 121 → `<Field Type="int" Name="BackupSetIndex" />`
- 122 → `<Field Type="int" Name="Version" />`

```
<File Type="FileRecordHash">
    <Header>
        <Field Type="fixedbinary" Length="16" Name="MachineGuid" />
        <Field Type="varbinary" Name="UniqueId" />
        <Field Type="int" Name="BytesPerCluster" />
    </Header>
    <Record>
        <Field Type="int" Name="Index" />
        <Field Type="fixedbinary" Length="16" Name="Hash" />
    </Record>
    <Sentinel>
        <Field Type="int" Value="-1" />
    </Sentinel>
</File>
```

110 — `<File Type="FileRecordHash">`
111 — `<Field Type="fixedbinary" Length="16" Name="MachineGuid" />`
112 — `<Field Type="varbinary" Name="UniqueId" />`
113 — `<Field Type="int" Name="BytesPerCluster" />`
120 — `<Record>`
121 — `<Field Type="int" Name="Index" />`
122 — `<Field Type="fixedbinary" Length="16" Name="Hash" />`

FIG. 30

```
<File Type="VolumeCluster">
    <Header>
        <Field Type="fixedbinary" Length="16" Name="MachineGuid" />
        <Field Type="varbinary" Name="UniqueId" />
        <Field Type="int" Name="BytesPerCluster" />
    </Header>
    <Record>
        <Field Type="int" Name="ClusterIndex" />
        <Field Type="int" Name="LowestVersion" />
        <Field Type="int" Name="HighestVersion" />
        <Field Type="fixedbinary" Length="16" Name="Hash" />
        <Field Type="int" Name="DataIndex" />
    </Record>
    <Sentinel>
        <Field Type="int" Value="-1" />
    </Sentinel>
</File>
```

- 210 — <File Type="VolumeCluster">
- 211 — MachineGuid field
- 212 — UniqueId field
- 213 — BytesPerCluster field
- 220 — <Record>
- 221 — ClusterIndex field
- 222 — LowestVersion field
- 223 — HighestVersion field
- 224 — Hash field
- 225 — DataIndex field

FIG. 31

```
<File Type="VolumeClusterLatest">
    <Header>
        <Field Type="fixedbinary" Length="16" Name="MachineGuid" />
        <Field Type="varbinary" Name="UniqueId" />
        <Field Type="int" Name="BytesPerCluster" />
        <Field Type="int" Name="BackupSetIndex" />
    </Header>
    <Record>
        <Field Type="int" Name="ClusterIndex" />
        <Field Type="fixedbinary" Length="16" Name="Hash" />
        <Field Type="int" Name="DataIndex" />
    </Record>
    <Sentinel>
        <Field Type="int" Value="-1" />
    </Sentinel>
</File>
```

310 — Header
311 — MachineGuid field
312 — UniqueId field
313 — BytesPerCluster field
314 — BackupSetIndex field
320 — Record
321 — ClusterIndex field
322 — Hash field
323 — DataIndex field

FIG. 32

```
<File Type="VolumeException">
    <Header>
        <Field Type="fixedbinary" Length="16" Name="MachineGuid" />
        <Field Type="varbinary" Name="UniqueId" />
        <Field Type="int" Name="BytesPerCluster" />
        <Field Type="int" Name="BackupSetIndex" />
    </Header>
    <Record>
        <Field Type="int" Name="OldClusterIndex" />
        <Field Type="int" Name="NewClusterIndex" />
    </Record>
    <Sentinel>
        <Field Type="int" Value="-1" />
    </Sentinel>
</File>
```

410 — `<File Type="VolumeException">`
411 — `<Field Type="fixedbinary" Length="16" Name="MachineGuid" />`
412 — `<Field Type="varbinary" Name="UniqueId" />`
413 — `<Field Type="int" Name="BytesPerCluster" />`
414 — `<Field Type="int" Name="BackupSetIndex" />`
420 — `<Record>`
421 — `<Field Type="int" Name="OldClusterIndex" />`
422 — `<Field Type="int" Name="NewClusterIndex" />`

MULTI-CLIENT CLUSTER-BASED BACKUP
AND RESTORE

TECHNICAL FIELD

This description relates generally to protecting against data loss and more specifically to cluster-based backup and restore technologies.

BACKGROUND

Backup has been an important aspect of computing since the invention of persistent memory systems, such as disk drives. With increasing data storage and personal computer ("PC") usage trends, the need for backup solutions is growing in importance. Medium sized and large businesses can typically afford data protection solutions, such as backup systems, and have a wide range of choices and an entire industry available to support them. However, the technology and products available to the typical consumer, home based business, or small business for protecting against data loss has not advanced in step with these trends. Yet such users are doing more and more important work on their PCs, and storing more and more precious, irreplaceable data. At the same time the quality of PC hardware, particularly consumer grade hard drives seems to be declining, increasing the risk of data loss.

Historically data loss was protected against by backing up user data files. Backing up system files and application was commonly avoided to save backup storage space and time. After a failure, a user typically re-installed the PC's operating system and applications from the original disks in addition to restoring lost data files. As Internet usage via the PC has grown, new variations of data loss have developed. Downloaded applications, for example, are becoming increasingly common—but it is also common for such applications to no longer be available when needed for a system restore. It is also increasingly common for a user to spend many hours setting up and configuring a PC—but it is uncommon for typical backup products to preserve every aspect of the PCs configuration. Thus, after restoring files following a system failure, the user is forced to spend the time required, again, to re-configure the PC to restore it to its pre-failure condition.

In addition to the significant time complete system restoration may take, common storage devices such as disk drives are becoming increasingly large in terms of storage capacity. It is now common for a new PC to include a disk drive with 200 GBs or more of storage space. A typical small office or home may have several such PCs. The amount of time and storage space required to create backups of these PCs using conventional mechanisms is often prohibitive. The amount of time required to restore from such backups may also be significant.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for backing up and restoring digital information stored on devices using cluster-based backup methods, including devices on a network.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 7a is a block diagram showing a continuation of example protocol state transitions and messages for performing a cluster-based backup operation.

FIG. 7b is a block diagram showing example protocol state transitions and messages for discovering client machines that have one or more backups in a backup server's database.

FIG. 19 is an XML description showing the schema of an example Commit data structure.

FIG. 20 is an XML description showing the schema of an example Control data structure.

FIG. 21 is an XML description showing the schema of an example Machines data structure.

FIG. 22 is an XML description showing the schema of an example VolumeConfig data structure.

FIG. 23 is an XML description showing the schema of an example BackupSet data structure.

FIG. 24 is an XML description showing the schema of an example GlobalCluster data structure.

FIG. 25 is an XML description showing the schema of an example GlobalClusterLatest data structure.

FIG. 26 is an XML description showing the schema of an example Index data structure.

FIG. 27 is an XML description showing the schema of an example Data data structure.

FIG. 28 is an XML description showing the schema of an example Volume data structure.

FIG. 29 is an XML description showing the schema of an example FileRecordHash data structure.

FIG. 30 is an XML description showing the schema of an example VolumeCluster data structure.

FIG. 31 is an XML description showing the schema of an example VolumeClusterLatest data structure.

FIG. 32 is an XML description showing the schema of an example VolumeException data structure.

Like reference numerals are used to designate like parts in the accompanying drawings.

DETAILED DESCRIPTION

The detailed description provided below in connection with the appended drawings is intended as a description of the present invention and is not intended to represent the only forms in which the present invention may be constructed or utilized. The description sets forth example functions of the invention and example sequences of steps for constructing and operating the invention. However, the same or equivalent functions and sequences may be accomplished by different examples.

Although the present invention is described and illustrated herein as being implemented in a networking and computing environment, the environment described is provided as an example and not a limitation. As those skilled in the art will appreciate, the present invention is suitable for implementation in a variety of different types of networking and computing systems.

Figure 1:
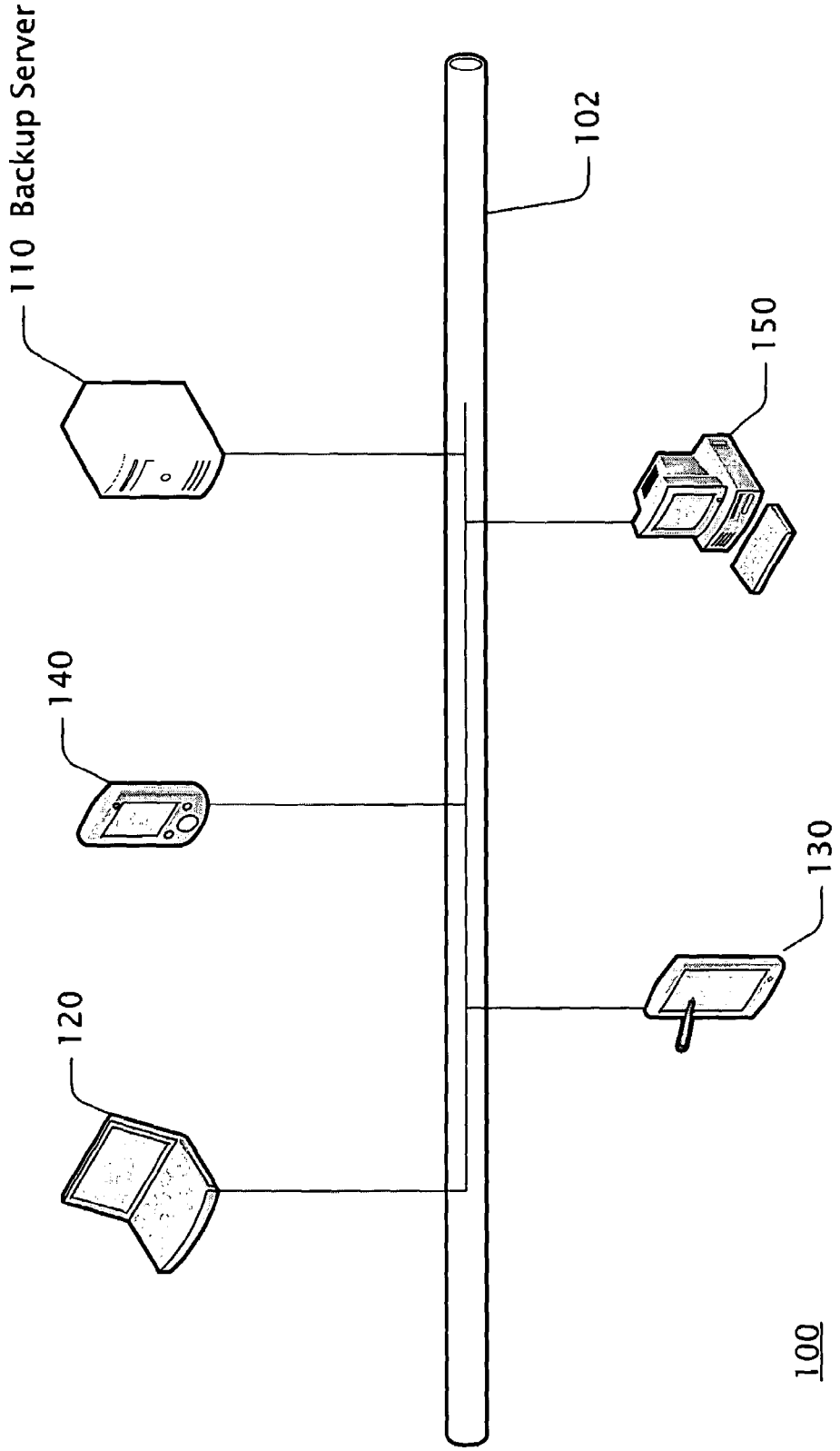
FIG. 1 is a block diagram showing an example networking environment including a backup server and several clients coupled via a network.

FIG. 1 is a block diagram showing an example networking environment 100 including a backup server 110 and several clients 120, 130, 140, and 150 coupled via a network 102. Backup server 110 and clients 120, 130, 140, and 150 are each example devices such as the computing environment described in connection with FIG. 35, or the like. Such devices include, but are not limited to, computing systems, files servers, main frames, personal computers ("PCs"), laptop computers ("laptops"), tablet PCs, hand-held devices, portable devices, embedded devices, electronic devices, machines and systems including computing devices such as appliances, automobiles, etc., set-top boxes, or any device that includes some form of storage device that may benefit from the backup technologies described herein. Such devices typically include some form of file system that provides for creating, locating, accessing, and maintaining files, folders, directories, file system metadata, and the like. Such a file system may be part of an operating system and typically translates requests for file operations into low-level, sector- or cluster-oriented tasks that can be understood by the systems controlling a storage device.

Network 102 may be any type of communications mechanisms providing for communications between backup server 110 and other devices on the network, such as example devices 120, 130, 140, and 150. Example communications mechanisms include wired networks including Ethernet, Universal Serial Bus ("USB"), FireWire, power line communication ("PLC"), and the like, as well as wireless networks including those using radio frequency ("RF"), infrared ("iR"), fiber optics and other light-based mechanisms, microwave links and the like, and other wireless mechanisms. Other examples include local area networks ("LANs"), wide area networks ("WANs"), storage area networks ("SANs"), metropolitan area networks ("MANs"), virtual private networks ("VPNs"), the Internet, and the like. Network 102 may also include a hardware bus internal to a device enabling the device to communicate between its own internal mechanisms, elements, storage devices, memory, and the like. Further examples of network 102 and network environment 100 are provided in connection with example computing device 3501, described in connection with FIG. 35.

Example devices 120, 130, 140, and 150 (also referred to herein as "clients" and "machines") as well as backup server 110 typically include, or are coupled to, some type of device or mechanism for storing digital information ("data") for which backup protection may be desirable (not shown in FIG. 1). Examples of such storage devices, including system memory and mass storage devices, are provided in connection with example computing device 3501, described in connection with FIG. 35. Further examples include any form of data storage device or mechanism that may benefit from having its contents protected via backup. Another example storage device may include a plurality of devices, such as that provided by a redundant array of independent disks ("RAID") or other array technologies or the like.

A storage device is also referred to herein as a "volume". A storage device such as a disk drive or the like may also be divided or "partitioned" into several volumes, each volume comprising a portion of the overall storage space of the storage device with each volume capable of being considered independently of the whole storage device and any other volumes on the storage device. Data stored on a volume is typically stored in a "file" or the like. Files are typically contained in folders, also commonly known as directories.

The term "backup", as used herein, refers to a copy of data, the copy existing in some form such that the original data can be restored, reconstructed, re-created, or the like, from the copy. Such data may include, but is not limited to, computer programs, applications, files, digital media, storage device content, memory content, user and/or machine settings, and any other type of information existing in a digitized format, whether that format is binary or otherwise. The related term "back up", as used herein, refers to the activity of producing a backup. The term "zero-touch back up", as used herein, refers to a system, such as one based on the technologies described herein, creating a backup with minimal or no intervention from a user of a device being backed-up. The types of activities avoided in a zero-touch back up system typically include requiring the user to load tapes, floppy disks, compact disks ("CDs"), or the like, push buttons, run programs, etc. at the time of the backup.

The terms "point-in-time backup" and "point-in-time backup version", as used herein, refer to backups made at a particular point in time, and that can be identified by a user based on the point in time the backup was made. Such a backup typically includes the data that was stored on a machine, or stored on one or more volumes of the machine, at the point in time the backup was made. For example, a user may be interested in restoring a file contained in a point-in-time backup created on Mar. 1, 2006 at 9:30 pm.

The verb "restore", as used herein, refers to the act of restoring, reconstructing, re-creating, or the like, data from a backup to a storage device. The nouns "restore" and "recovery", as used herein, refer to data being restored and/or the act of restoring data—for example, "doing a restore," or "doing a recovery". The storage device to which data is restored may be the device from which the data was originally backed up, or any other storage device. A restore may be "complete" or "partial". For example, a user may replace a crashed hard drive, the only drive in their machine, and then restore the entire machine—a complete restore, or the user may restore a file, perhaps accidentally deleted, from a previous backup—a partial restore.

The term "bare-metal recovery" ("BMR"), as used herein, refers to a complete restore or recovery of a machine, typically the including operating system(s), user data, and user and machine settings as preserved in the backup being restored. A BMR may be performed on the machine from which the backup was originally made or, alternatively, on a different machine—such as when a user purchases a new PC to replace a current, older PC.

"Mounting" a storage device or a volume, as used herein, refers to making the volume accessible to a machine's file system such that data (files, folders, related metadata, and the like) on the mounted volume can be accessed by the machine. In one example, the present invention enables a backup created using the present examples to be mounted, as if the backup was a remote volume, thus enabling file system access by the machine to data in the backup. Further, such a mounting may be performed on a machine prior to the normal operating system being loaded, such as in a preinstallation environment such as the Microsoft Windows preinstallation environment ("WinPE").

A file system typically includes a master file table ("MFT") or the like that contains information about the files, folders and other data on a volume. Such information may be termed file system "metadata"—data about the files, folders, directories, and other data on the volume. This metadata typically includes "file records" or the like that describe files on the volume. A file record may also describe a folder, directory, or other data on the volume. A file record typically includes data about a file or folder such as time stamps, attributes, the file's or folder's name, security information, file or folder content or data, references or pointers to additional content or data not present in the file record, etc. Some types of file records may contain other data and/or may not include some of the example data listed here. Such a file record can typically be analyzed to determine if a file or the like has changed over time, or whether it has changed since the last time its file record was analyzed.

Examples of an MFT include a master file table as defined in the Microsoft Windows NT file system ("NTFS"), a file allocation table ("FAT"), and other tables or data structures for maintaining file system metadata. Examples of a file record include a file record as define in NTFS, a table or folder entry such as defined in a FAT, and other records, entries, data structures, and the like that describe files, folders, directories, and the like. The present invention may operate with these and/or other types of MFTs and file records.

File system data, metadata, files, folders, directories, and the like are typically stored on a storage device, such as a disk drive, in storage units known as "clusters". Such a storage device is typically divided into clusters, the clusters being of uniform size, each cluster capable of holding a specific number of bytes of data. Thus, a cluster is typically the basic unit of storage for a storage device. Examples of cluster sizes include 2048 bytes, 4096 bytes, and 8192 bytes. When a file system stores information in a cluster, the cluster is said to be "in-use". When the file system no longer needs the information previously stored in a cluster, such as when a file, a portion of which is stored in the cluster, is deleted or the like, the cluster may no longer be in-use, even if the data remains unchanged. The terms "cluster", "cluster content", and "cluster data" tend to be used interchangeably and generally refer to the data content of a cluster as the cluster.

The present invention makes use of hash values to uniquely identify the contents of clusters and other data structures, such as file records and the like. A hash value ("hash"), as used herein, is the output value of a function ("hash function" or "function") that calculates a unique output value given some input data. Such a function is typically said to calculate a value that is "statistically unique" ("unique") because the probability is very high that the function will produce different values given different input data, and will produce the same hash value given the same input data. Stated another way, a value is said to be "statistically unique" ("unique") when it has a negligible probability of occurring again in a set of such values. One example of such a function is the message digest 5 ("MD5") hashing function that calculates a fixed-size hash value from arbitrarily long input data. Other hashing function examples include the secure hash algorithm-1 ("SHA-1") and the SHA-256 hashing functions. The present invention can operate using the foregoing example hashing functions or any other function or mechanism that calculates unique output values given different input data. In one example, the present invention calculates a file record hash by providing a file record to a hashing function as input data. In another example, a cluster hash is calculated by providing the content of a cluster as input data to a hashing function.

Figure 2:
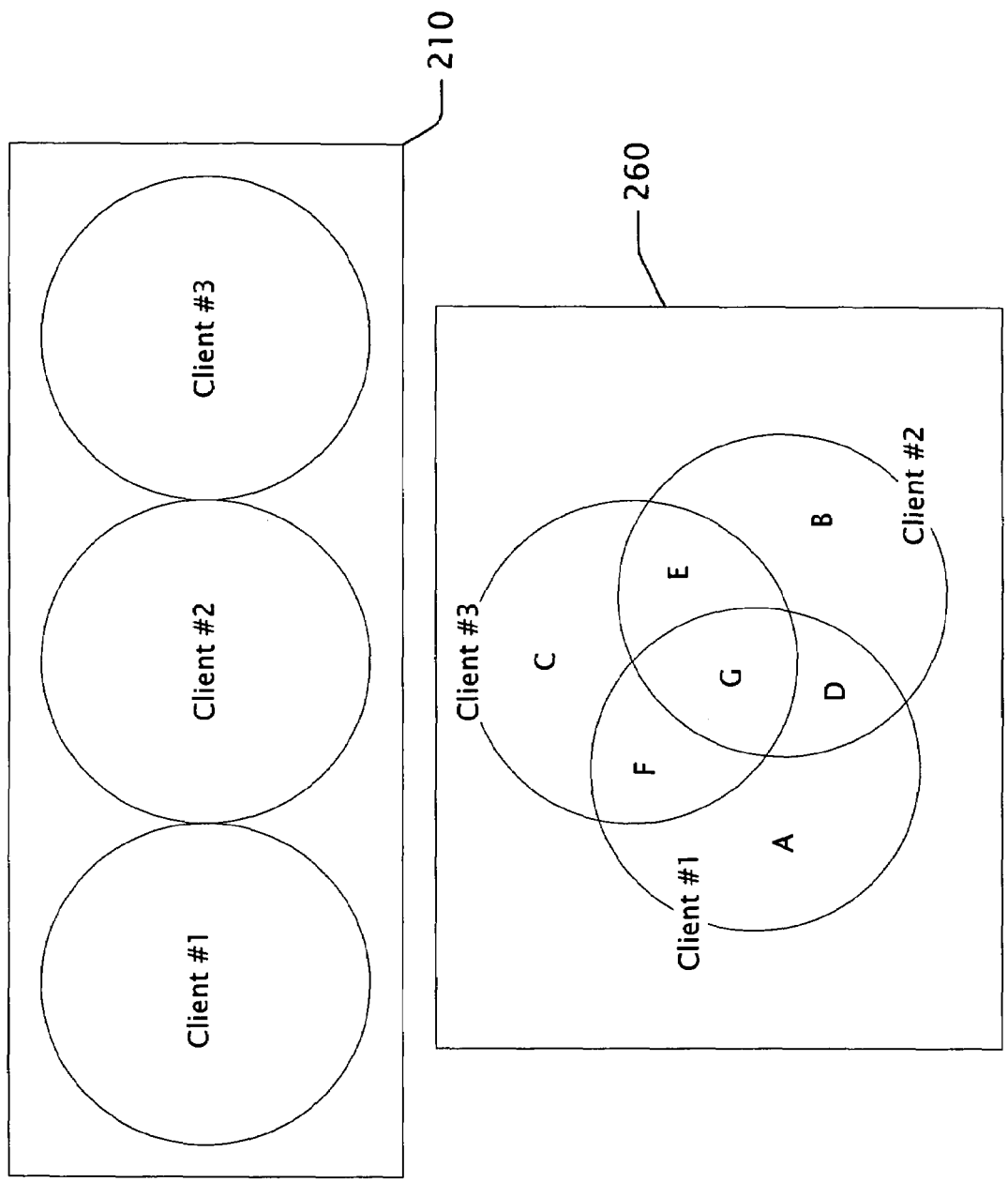
FIG. 2 is a block diagram showing example backup space requirements with and without single-instance storage across clients.

FIG. 2 is a block diagram showing example backup space requirements with and without single-instance storage across clients. Shown are two backup variations 210 and 260 and their respective backup storage requirements. Each circle represents the storage required for a client backup. Variation 210 does not use single-instance storage across clients while variation 260 does. Variation 210 shows the total backup storage space required for three clients when not making use of single-instance storage across client #1, client #2, and client #3. The total backup storage space required for variation 210 is the sum of the three circles. Variation 260 shows the total backup storage space required for the same three clients when making use of single-instance storage across the clients. The total backup storage space required for variation 260 is the sum of the three circles minus any data shared in common between the clients. Specifically, the backup storage space savings with variation 260 over variation 210 can be calculated as:

Backup storage space savings=D+E+F+G+G where, with respect to the above formula and as shown in variation 260 of FIG. 2:

A=unique data on client #1
B=unique data on client #2
C=unique data on client #3
D=data common to both client #1 and client #2
E=data common to both client #2 and client #3
F=data common to both client #3 and client #1
G=data common to all of client #1, client #2, and client #3

In the case of multiple clients all being backed up by the same system, all of which include the same operating system and many of the same applications, programs, and other data, it can be seen that there will likely be much data in common between the clients. In a case such as this, significant backup storage space savings can be realized by making use of single-instance storage across clients. In one example of the present invention backing up 12 clients including 29 volumes, laboratory testing has shown that backup storage space savings of 80% or more are achievable over common backup techniques not making use of single-instance storage across clients.

The term "single-instance storage", as used herein, refers to storing a single copy of data even when duplicates of the data exist multiple times. A reference to the single copy of the data is stored in the place of storing each duplicate copy of the data, as opposed to storing the duplicate data itself multiple times. The use of such a reference is typically made when the reference itself is smaller than the data it is replacing. The term "single-instance storage across clients", as used herein, includes the meaning ascribed herein to single-instance storage and further includes using references for duplicate data when the duplicate data is found, not only on a single client, but also on multiple clients, all of which are being backed up by the same backup system.

Another aspect of the present invention for saving storage space is to exclude from client backups any temporary data, cached data, and the like, that exists on the client. Temporary and cache data typically includes: temporary files stored by Internet browsers, such as temporary Internet files, temporary index files, etc.; temporary files created when installing and/or deleting applications; temporary files created by the operating system and by programs and applications, and the like; cache files created by virtual memory systems, such as page files and swap files; cache files created when a machine goes into hibernation, and the like. Such temporary and cache files may have no useful purpose upon restore and are typically not required for the proper operation of a machine. As described in more detail below, the present invention provides for automatically excluding such temporary and cache files from backups, thus reducing backup storage space requirements.

Figure 3:
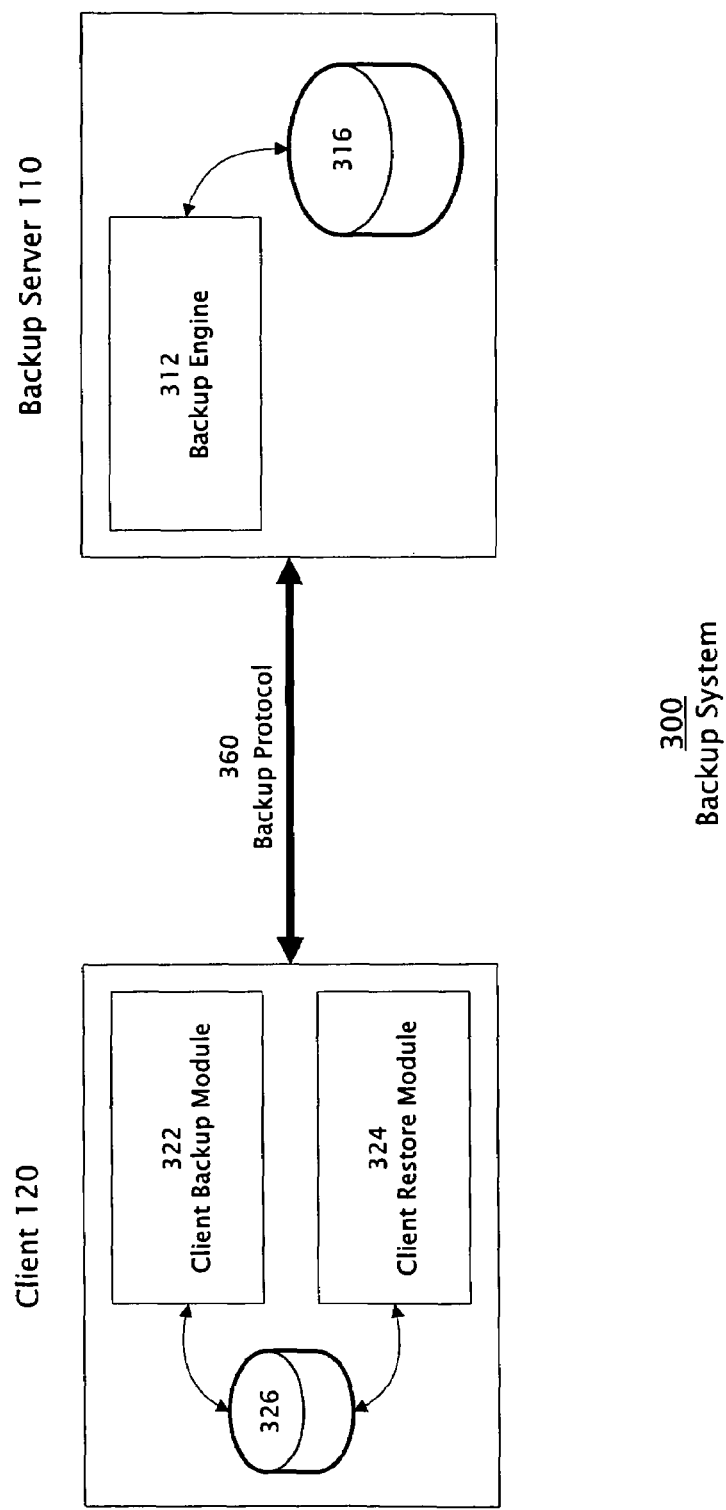
FIG. 3 is a block diagram showing an example backup system including a backup engine and a client backup module and a client restore module, both modules coupled to the backup engine via a backup protocol.

FIG. 3 is a block diagram showing example backup system 300 including backup engine ("BE") 312 and client backup module ("CBM") 322 and client restore module ("CRM") 324, both modules coupled to BE 312 via backup protocol ("protocol") 360. Client 120 and backup server 110 host the elements of backup system 300. Client 120 is shown as an example client and may be any type of device that would benefit from backups. Any number of clients may be coupled to backup server 110 via protocol 360. Client 120 includes volume 326, an example volume benefiting from backup. Backup server 110 includes volume 316 for storing backups, temporary data used in the creation of backups, etc. Volume 316 may also include other data, such as the operating system for backup server 100, the BE 312 application, other applications and data, etc.

Example client backup module 322 and example client restore module 324 are shown in FIG. 3 as separate software modules. In another example, CBM 322 and CRM 326 may be implemented as a single software module or, alternatively, as a collection of several modules together providing equivalent functionality. Such a software module may be implemented as an executable program, a device driver, script, application, or the like.

Backup protocol 360 provides a set of protocol messages ("messages") for communications and exchange of information between clients, such as client 120, and backup server 100. Protocol 360 is typically used over a network. Protocol 360 is used by CBM 322 and CRM 326, operating on example client 120, to perform backup and restore operations in conjunction with BE 312, operating on backup server 110. In one example, as a matter of convention, messages sent by a client are termed "requests" while messages sent by a backup server are termed "responses." In another example, the client and backup server may be the same device.

One portion of protocol 360 enables clients to discover the existence of backup servers so that a client can subsequently establish a backup protocol session with a backup server. Included in protocol 360 is a message the client can send to discover any backup servers that exist on the client's network, as well as a message for backup servers to respond to a client discovery request. Following is an example of such discovery messages. In the example, each message includes: a "name", which is the name of the message; a "type", which is either a "request" indicating the message is sent by a client, or a "response" indicating the message is sent by a backup server; a "description" that describes the purpose and function of the message; a "message code" that is an integer value that uniquely identifies the message within protocol 360; and a list of "parameters" indicating specific data accompanying the message, including the name and type of any parameters along with a description of the parameters.

In the example, user datagram protocol ("UDP") over internet protocol ("IP") via port number 8912 is used to transport protocol 360 discovery messages. In alternate examples, any port number and any connectionless transport protocol, such as Internetwork Packet Exchange ("IPX") or the like, may be used as well as connection-oriented transport protocols such as Transmission Control Protocol ("TCP"), Sequenced Packet Exchange ("SPX"), Transport Layer Security ("TLS"), or the like. In yet another example, universal plug and play ("UPnP") or the like may be used for backup server discovery.

Protocol 360 example discovery message set:

---

Name: DiscoverServers                              Type: request
Description: A client broadcasts a DiscoverServers request in order to discover backup servers that exist on the network. The client expects to receive a ServerHere response from each backup server.
Message code: 0
Parameters: (none)

Name: ServerHere                                   Type: response
Description: Whenever a back server receives a DiscoverServers request, it responds to the sender with a ServerHere response. The response is sent to the IP address and port number from which the DiscoverServers request was received.
Message code: −1
Parameters:
    Name: serverName                           Type: string -continued

| Name: currentVersion | Type: integer |
|---|---|
| Name: lowestVersion | Type: integer | serverName is a displayable name of the backup server, the short-form machine name.
currentVersion is the version of the TCP protocol that was current when the backup server was compiled.
lowestVersion is the lowest version of the TCP protocol that the backup server understands.

To discover a backup server, client 120 sends a DiscoverServers request. This request is typically broadcast—that is, sent to all devices networked to the client. Any backup server receiving this request typically sends a ServerHere response including a serverName parameter uniquely identifying the responding backup server. The parameters in the ServerHere response may be used by the client to establish a TCP connection and session with the backup server. With the establishment of the TCP session, a backup protocol session ("protocol session") is also established and protocol 360 enters the AwaitingBanner state. This and other example protocol states are described below. Alternatively, a protocol session may be established using TLS over TCP, or any reliable session-oriented protocol.

In one example, protocol 360 defines a set of protocol states, each state describing what messages are legal for a client and/or backup server to send while the protocol is in a particular state. Sending or receiving some messages may change the state of protocol 360 while other messages may leave the protocol state unchanged. Each state includes: a "name" that identifies the state; a "description" that describes the state; a list of "allowed requests" indicating client requests allowed while the protocol is in the state; and a list of "allowed responses" indicating backup server responses allowed while the protocol is in the state.

Protocol 360 example state set:
  Name: AwaitingBanner
  Description: A newly opened TCP session puts the protocol in this state.
  Allowed Requests: (none)
  Allowed Responses: Banner
  Name: AwaitingProtocolVersion
  Description: A protocol session enters this state once in its lifetime, after a Banner response is sent.
  Allowed Requests: ProtocolVersion
  Allowed Responses: (none)
  Name: Idle
  Description: In this state, the protocol session has been fully established, but specific operation is occurring. The protocol returns to this state after any operation is completed. Absent catastrophic errors, the client should only close the TCP connection while in this state. The backup server should only close the TCP connection after the client has done so.
  Allowed Requests:
    BeginBackupSet
    GetMachines
    GetVolumeConfigs
    GetBackupSets
    GetVolumes
    BeginNtlmAuth
    SimpleAuth
    BeginRestore
    SetBackupSchedule
  Allowed Responses: (none)
  Name: AwaitingBeginBackupSetResponse
  Description: In this state, a BeginBackupSet request has been sent, but the corresponding BeginBackupSet response has not.
  Allowed Requests: (none)
  Allowed Responses:
    Waiting
    BeginBackupSet
  Name: AwaitingBeginBackupResponse
  Description: In this state, a BeginBackup request has been sent, but the corresponding BeginBackup response has not.
  Allowed Requests: (none)
  Allowed Responses:
    BeginBackup
    BeginBackupFailed
  Name: AwaitingvolumeConfigRequest
  Description: In this state, a BeginBackupSet response has been sent, but the corresponding EndVolumeConfig request has not.
  Allowed Requests:
    VolumeConfig
    EndVolumeConfig
  Allowed Responses: (none)
  Name: AwaitingBeginBackupRequest
  Description: In this state, a backup set has been started, but no individual volume backup operation is in progress.
  Allowed Requests:
    BeginBackup
    EndBackupSet
  Allowed Responses: (none)
  Name: FileRecordHash
  Description: In this state, the backup server is sending FileRecordHash responses describing the state of the previous backup operation, and the client is sending FileRecordHash requests describing the state of the current backup operation.
  Allowed Requests:
    FileRecordHash
  Allowed Responses:
    FileRecordHash
    EndFileRecordHash
  Name: EndFileRecordHash
  Description: In this state, the backup server has sent an EndFileRecordHash response to the client, but the client has not yet sent an EndFileRecordHash request to the server.
  Allowed Requests:
    FileRecordHash
    EndFileRecordHash
  Allowed Responses: (none)
  Name: AwaitingClusterHashCount
  Description: In this state, the client has sent an EndFileRecordHash request, but has not yet sent a ClusterHashCount request.
  Allowed Requests:
    ClusterHashCount
  Allowed Responses: (none)
  Name: ClusterHash
  Description: In this state, the client is sending hashes of clusters to the backup server.
  Allowed Requests:
    ClusterHash
    ClusterUnchanged
    EndClusterHashes
  Allowed Responses: (none)
  Name: BackupWorking Description: In this state, the client is waiting for the backup server to determine which clusters it needs.
Allowed Requests: (none)
Allowed Responses:
    Working
    NeedClusterCount
Name: BackupClusterData
Description: In this state, the backup server is sending NeedClusterData responses and the client is sending ClusterData requests.
Allowed Requests:
    ClusterData
Allowed Responses:
    NeedClusterData
    EndNeedClusterData
Name: AwaitingEndBackupRequest
Description: In this state, the backup server has sent an EndNeedClusterData response, but the client may not have finished sending ClusterData requests.
Allowed Requests:
    ClusterData
    EndBackup
Allowed Responses: (none)
Name: AwaitingEndBackupResponse
Description: In this state, the client has sent an EndBackup request, but the backup server has not yet sent an End-Backup response.
Allowed Requests: (none)
Allowed Responses:
    Working
    EndBackup
Name: AwaitingEndBackupSetResponse
Description: In this state, the client has sent an EndBackupSet request, but the backup server has not yet sent an EndBackupSet response.
Allowed Requests: (none)
Allowed Responses:
    EndBackupSet
Name: AwaitingMachines
Description: In this state, the client has sent a GetMachines request, but the backup server has not yet sent an End-Machines response.
Allowed Requests: (none)
Allowed Responses:
    Machine
    EndMachines
Name: AwaitingvolumeConfigs
Description: In this state, the client has sent a GetVolumeConfigs request, but the backup server has not yet sent an EndVolumeConfigs response.
Allowed Requests: (none)
Allowed Responses:
    VolumeConfig
    EndVolumeConfigs
Name: AwaitingBackupSets
Description: In this state, the client has sent a GetBackupSets request, but the backup server has not yet sent an EndBackupSets response.
Allowed Requests: (none)
Allowed Responses:
    BackupSet
    EndBackupSets
Name: AwaitingVolumes
Description: In this state, the client has sent a GetVolumes request, but the backup server has not yet sent an EndVolumes response.
Allowed Requests: (none)
Allowed Responses:
    Volume
    EndVolumes
Name: AwaitingNtlmResponse
Description: In this state, the client has sent a BeginNtlmAuth or ContinueNtlmAuth request that the backup server has not yet responded to.
Allowed Requests: (none)
Allowed Responses:
    ContinueNtlmAuth
    Authorized
    NotAuthorized
    AuthFailed
Name: AwaitingNtlmRequest
Description: In this state, the backup server has sent a ContinueNtlmAuth response to which the client has not yet responded.
Allowed Requests:
    ContinueNtlmAuth
Allowed Responses: (none)
Name: AwaitingSimpleAuth
Description: In this state, the client has sent a SimpleAuth request to which the backup server has not yet responded.
Allowed Requests: (none)
Allowed Responses:
    Authorized
    NotAuthorized
    AuthFailed
Name: AwaitingBeginRestore
Description: In this state, the client has sent a BeginRestore request to which the backup server has not yet responded.
Allowed Requests: (none)
Allowed Responses:
    Waiting
    Working
    BeginRestore
    BeginRestoreFailed
Name: Restoring
Description: In this state, a restore operation is in progress.
Allowed Requests:
    GetClusters
    EndRestore
Allowed Responses:
    ClusterData
    ClusterDataBad
    ClusterDataMissing
Name: AwaitingEndRestore
Description: In this state, the client has sent an EndRestore request to which the backup server has not yet responded.
Allowed Requests: (none)
Allowed Responses:
    EndRestore
Name: AwaitingSetBackupScheduleResponse
Description: In this state, the client has sent a SetBackupSchedule request to which the backup server has not yet responded.
Allowed Requests: (none)
Allowed Responses:
    SetBackupSchedule Once a protocol session is established, protocol state transitions result from the client and server in the session sending various protocol messages ("messages") to each other. One example of a set of protocol 360 request and response messages is provided below. In the example, each message includes: a "name", which is the name of the message; a "type", which is either a "request" indicating the message is for sent by a client, or a "response" indicating the message is sent by a backup server; a "description" that describes the purpose and function of the message; a "message code" that is an integer value that uniquely identifies the message within the protocol; a "prestate" that indicates allowed states prior to the message being sent; a "poststate" that indicates the new state of the protocol after the message is sent; and a list of "parameters" indicating specific data accompanying the message, including the name and type of any parameters and a description of the parameters.

In the example, Transmission Control Protocol ("TCP"), over Internet Protocol ("IP") via port number 8912 is used to transport protocol 360 request and response messages. In alternate examples, any port number and any connection-oriented transport protocol, such as Sequenced Packet Exchange ("SPX") or the like, may be used as well as connectionless transport protocols such as User Datagram Protocol ("UDP"), Internetwork Packet Exchange ("IPX"), or the like.

Protocol 360 example message set:

---

Name: Abort                              Type: request
Description: An Abort request is sent by the client to indicate that something catastrophic has occurred and the protocol session cannot continue. Unlike other messages, an Abort request may be sent at any time. After sending an Abort, the client should close the TCP connection.
Message code: 1
Prestate: any
Poststate: (none)
Parameters:
    Name: reason                         Type: string
reason contains text describing the reason for the Abort request.

---

Name: Abort                              Type: response
Description: An Abort response is sent by the backup server to indicate that something catastrophic has occurred and the session cannot continue. Unlike other messages, an Abort response may be sent at any time. After sending an Abort, the server should close the TCP connection
Message code: −1
Prestate: any
Poststate: any
Parameters:
    Name: reason                         Type: string
reason contains text describing the reason for the Abort request.

---

Name: Banner                             Type: response
Description: The Banner response is sent by the backup server immediately after the TCP connection is established.
Message code: −2
Prestate:
    AwaitingBanner
Poststate:
    AwaitingProtocolVersion
Parameters:
    Name: currentVersion                 Type: integer
    Name: lowestVersion                  Type: integer

--- currentversion is the version of the protocol that was newest when the backup server code was built.
lowestversion is the oldest version of the protocol that the backup server understands.

---

Name: ProtocolVersion                    Type: request
Description: This is the first message sent by the client; it chooses the version of the protocol that will be used.
Message code: 2
Prestate:
    AwaitingProtocolVersion
Poststate:
    Idle
Parameters:
    Name: versionNumber                  Type: integer
    Name: lcid                           Type: integer

--- versionNumber must be in the range of versions supported by the backup server as contained in the previous Banner response.
lcid is a locale id describing the client's preferred language (and similar parameters) for messages from the backup server.

---

Name: Waiting                            Type: response
Description: A Waiting response is sent by the backup server when there will be a delay before the requested operation can be started, typically because some other operation is in progress.
Message code: −3
Prestate:
    AwaitingBeginBackupSet
    AwaitingBeginRestore
Poststate: (unchanged)
Parameters:
    Name: count                          Type: integer
    Name: machineName                    Type: string
    Name: percentDone                    Type: integer
count is the number of operations that are pending before the current one.

--- machineName occurs count times, and are the names of the machines that initiated the pending operations, in the order in which they will be performed.
percentDone is the estimated completion percent of the first pending operation, in the range [0.100] inclusive.

---

Name: Working                            Type: response
Description: The backup server sends this response while working on an operation that may take a while.
Message code: −4
Prestate:
    BackupWorking,
    AwaitingBeginRestore
    AwaitingEndBackupResponse
Poststate: (unchanged)
Parameters:
    Name: percentDone                    Type: integer
percentDone is the estimated completion percent of the operation, in the range [0..100] inclusive.

---

Name: BeginBackupSet                     Type: resquest
Description: The client sends this message to begin a new backup set.
Message code: 3
Prestate:
    Idle
Poststate:
    AwaitingBeginBackupSetResponse
Parameters:
    Name: computerGuid                   Type: byte[16]

-continued

```
Name: computerName                  Type: string
Name: computerDescription           Type: string
Name: backupCount                   Type: integer
```
computerGuid is a GUID chosen by the client machine. It should be unique across all different clients, but unchanging over time for a single client.

computerName is a name for the client machine.
computerDescription is a string description of the client machine.
backupCount is the number of volumes that the client expects to back up in this backup set.

```
Name: BeginBackupSet                Type: response
Description: A client sends this message to begin a new backup set.
Message code: −5
Prestate:
    AwaitingBeginBackupSetResponse
Poststate:
    AwaitingVolumeConfigRequest
Parameters:
    Name: backupSetIndex            Type: Integer
``` backupSetIndex is the index of the new backup set. The first backup set index for any client is 1, and the indices increment sequentially.

```
Name: VolumeConfig                  Type: request
Description: The client sends one of these messages for each volume
whose configuration is to be remembered by the backup server. This
may include volumes other than those being backed up.
Message code: 4
Prestate:
    AwaitingVolumeConfigRequest
Poststate: (unchanged)
Parameters:
    Name: uniqueIdentifier          Type: byte[ ]
    Name: friendlyName              Type: string
    Name: volumeBytes               Type: integer
```
uniqueIdentifier is a variable byte array unique identifier for the volume (from IOCTL_MOUNTDEV_GET_UNIQUE_ID).
friendlyName is a friendly name to associate with the volume (such as "C:").
volumeBytes is the size of the volume, in bytes.

```
Name: EndVolumeConfig               Type: request
Description: The client sends one of these messages after it has sent
the last VolumeConfig request.
Message code: 5
Prestate:
    AwaitingVolumeConfigRequest
Poststate:
    AwaitingBeginBackupRequest
Parameters: (none)
```

```
Name: BeginBackup                   Type: request
Description: A client sends this message to begin a backup operation.
Message code: 6
Prestate: AwaitingBeginBackupRequest
Poststate: AwaitingBeginBackupResponse
Parameters:
    Name: uniqueIdentifier          Type: byte[ ]
```

-continued

```
Name: volumeName                    Type: string
Name: fileSystem                    Type: string
Name: volumeSerialNumber            Type: integer
Name: bytesPerSector                Type: integer
Name: bytesPerCluster               Type: integer
Name: initialVolumeBytes            Type: integer
Name: isActive                      Type: boolean
```
uniqueIdentifier is a unique identifier for the volume (from IOCTL_MOUNTDEV_GET_UNIQUE_ID).
volumeName is the name or drive letter of the volume begin backed up.
fileSystem is the name of the file system used on the volume. For NTFS, this is the literal string "NTFS".
volumeSerial is the serial number of the volume.
bytesPerSector is the number of bytes per sector on the volume's disk.
bytesPerCluster is the number of bytes per cluster on the volume's disk.
initialVolumeBytes is the size of the volume being backed up, in bytes.
isActive is true if the volume is the active partition on its disk.

```
Name: BeginBackup                   Type: response
Description: The backup server sends this response when it is willing
to begin a backup operation.
Message code: −6
Prestate:
    AwaitingBeginBackupResponse
Poststate:
    FileRecordHash
Parameters: (none)
```

```
Name: BeginBackupFailed             Type: response
Description: The backup server sends this response when it cannot
initiate a backup operation for some reason.
Message code: −7
Prestate:
    AwaitingBeginBackupResponse
Poststate:
    Idle
Parameters:
    Name: reason                    Type: string
```
reason is a description of why the request failed. It is localized in the locale specified by the ProtocolVersion request.

```
Name: FileRecordHash                Type: request
Description: The client sends one of these requests for each in-use
file record on the volume. These are sent in strictly ascending order
of file index.
Message code: 7
Prestate:
    FileRecordHash
    EndFileRecordHash
Poststate: (unchanged)
Parameters:
    Name: fileIndex                 Type: integer
    Name: hash                      Type: byte[16]
```
fileIndex is the index of the file record.

hash is the MD5 hash of that file record.

---

Name: FileRecordHash                Type: response
Description: The backup server sends one of these responses for
each file record that was in use at the time of the last backup. These
responses are typically sent in ascending order of file index.
Message code: −8
Prestate:
    FileRecordHash
Poststate: (unchanged)
Parameters:
    Name: fileindex                 Type: integer
    Name: hash                      Type: byte[16]
fileIndex is the index of file record.
hash is the MD5 hash of the file record.

---

Name: EndFileRecordHash             Type: request
Description: The client sends one of these requests after it has sent
every FileRecordHash request, and it has received the
EndFileRecordHash response.
Message code: 8
Prestate:
    EndFileRecordHash
Poststate:
    AwaitingClusterHashCount
Parameters: (none)

---

Name: EndFileRecordHash             Type: response
Description: The backup server sends one of these requests after it
has sent every FileRecordHash response.
Message code: −9
Prestate:
    FileRecordHash
Poststate:
    EndFileRecordHash
Parameters: (none)

---

Name: ClusterHashCount              Type: request
Description: The client sends one of these requests to inform the
backup server of the maximum number of ClusterHash requests
that it intends to send. The content of this request must be greater
than or equal to the number of ClusterHash requests.
Message code: 9
Prestate:
    AwaitingClusterHashCount
Poststate:
    ClusterHash
Parameters:
    Name: count                     Type: integer
count is an upper bound on the number of ClusterHash requests.

---

Name: ClusterHash                   Type: request
Description: The client sends one of these requests for each cluster
that is in use, if the client can't prove that the cluster is unchanged
since the previous backup. Along with the ClustersUnchanged
requests, these requests are sent in strictly ascending order of cluster
index.
Message code: 10
Prestate:
    ClusterHash
Poststate: (unchanged)
Parameters:

---

-continued

Name: clusterIndex              Type: integer
    Name: hash                      Type: byte[16]
clusterIndex is the zero-based index of a cluster on the disk.

--- hash is the MD5 hash of the contents of that cluster.

---

Name: ClustersUnchanged             Type: request
Description: The client sends one of these requests for each
contiguous run of clusters that are in use, for which the client can
prove they haven't been changed since the previous backup. Along
with the ClusterHash requests, these requests are sent in strictly
ascending order of cluster index.
Message code: 11
Prestate:
    ClusterHash
Poststate: (unchanged)
Parameters:
    Name: clusterIndex              Type: integer
    Name: clusterCount              Type: integer
clusterIndex is the zero-based index of the first cluster of a run of
clusters that are in use and unchanged.

--- clustercount is the number of clusters in the run of clusters
that are in use and unchanged.

---

Name: EndClusterHashes              Type: request
Description: The client sends this request after it has sent all of its
ClusterHash and ClustersUnchanged requests.
Message code: 12
Prestate:
    ClusterHash
Poststate:
    BackupWorking
Parameters: (none)

---

Name: NeededClusterCount            Type: response
Description: The backup server sends one of these requests to the
client to inform it of an upper bound on the total number of clusters
that will be requested via NeedClusterData responses.
Message code: −10
Prestate:
    BackupWorking
Poststate:
    BackupClusterData
Parameters:
    Name: maxClusterCount           Type: integer
maxClusterCount is a close upper bound on the number of clusters
that will be requested via NeedClusterData responses.

---

Name: NeedClusterData               Type: response
Description: The backup server sends one of these requests for each
contiguous run of clusters that it wants the client to send the
contents of. These will typically be in strictly ascending order of
cluster index.
Message code: −11
Prestate:
    BackupClusterData
Poststate:
    BackupClusterData
Parameters:
    Name: clusterIndex              Type: integer
    Name: clusterCount              Type: integer -continued clusterIndex is the zero-based index of the first cluster of a contiguous run that should be sent to the backup server.

clusterCount is the number of clusters in the run that should be sent to the backup server.

Name: ClusterData                           Type: request
Description: The client sends one of these requests for each cluster that the backup server needs the contents of. They are typically sent in increasing order of cluster index.
Message code: 13
Prestate:
    BackupClusterData
    AwaitingEndBackupRequest
Poststate: (unchanged)
Parameters:
    Name: clusterIndex                      Type: integer
    Name: clusterData                       Type: byte[ ]
clusterIndex is the zero-based index of the cluster.

clusterData is a byte array of the contents of the cluster. Its length is typically the same as the clusterSize parameter of the BeginBackup request.

Name: EndNeedClusterData                    Type: response
Description: The backup server sends one of these responses after it has sent all of its NeedClusterData responses.
Message code: −12
Prestate:
    BackupClusterData
Poststate:
    AwaitingEndBackupRequest
Parameters: (none)

Name: EndBackup                             Type: request
Description: The client sends one of these requests to end the backup operation, to ask the backup server to commit the operation.
Message code: 14
Prestate:
    AwaitingEndBackupRequest
Poststate:
    AwaitingEndBackupResponse
Parameters:
    Name: minimumRestoreBytes               Type: integer
    Name: clientInfo                        Type: integer
minimumRestoreBytes is the size of the smallest volume (in bytes) to which the backed-up image can be successfully restored.

clientInfo is any binary string. The back server will save, but typically not interpret, this string.

Name: EndBackup                             Type: response
Description: The backup server sends one of these responses upon successfully committing the backup.
Message code: −13
Prestate:
    AwaitingEndBackupResponse
Poststate:
    AwaitingBeginBackupRequest
Parameters: (none)

Name: EndBackupSet                          Type: request
Description: The client sends one of these requests after the last backup in a backup set has been completed.
Message code: 15
Prestate:
    AwaitingBeginBackupRequest
Poststate:
    AwaitingEndBackupSetResponse
Parameters: (none)

Name: EndBackupSet                          Type: response
Description: The backup server sends one of these messages in response to an EndBackupSet request.
Message code: −14
Prestate:
    AwaitingEndBackupSetResponse
Poststate:
    Idle
Parameters: (none)

Name: GetMachines                           Type: request
Description: A client sends one of these requests to find out what client machines have backups in the backup server database. In response, the backup server will send a sequence of Machine responses followed by an EndMachines response.
Message code: 16
Prestate:
    Idle
Poststate:
    AwaitingMachines
Parameters: (none)

Name: Machine                               Type: response
Description: In response to a GetMachines request, the backup server sends one of these responses for each client machine in the database.
Message code: −15
Prestate:
    AwaitingMachines
Poststate: (unchanged)
Parameters:
    Name: machineGuid                       Type: byte[16]
    Name: machineName                       Type: string
    Name: machineDescription                Type: string
    Name: scheduleDays                      Type: integer
    Name: scheduleMinutes                   Type: integer
    Name: macAddress                        Type: binary[6]
machineGuid, machineName, machineDescription, scheduleDays and scheduleMinutes are the values supplied by the most recent BeginBackupSet or SetBackupSchedule request from the client.

macAddress is the MAC address from which the most recent BeginBackupSet or SetSchedule request for the client was received.

Name: EndMachines                           Type: response
Description: The backup server sends one of these responses after sending all of its Machine responses.
Message code: −16
Prestate:
    AwaitingMachines -continued Poststate:
    Idle
Parameters: (none)

---

Name: GetVolumeConfigs                    Type: request
Description: The client sends one of these requests to find out what VolumeConfig information exists for a machine. In response, the backup server will send a sequence of VolumeConfig responses followed by an EndVolumeConfigs response.
Message code: 17
Prestate:
    Idle
Poststate:
    AwaitingVolumeConfigs
Parameters:
    Name: machineGuid                    Type: byte[16]
machineGuid is the GUID of the client whose data is desired.

---

Name: VolumeConfig                         Type: response
Description: In response to a GetVolumeConfigs request, the backup server sends one of these messages for each volume for which it has configuration data.
Message code: −17
Prestate:
    AwaitingVolumeConfigs
Poststate: (unchanged)
Parameters:
    Name: machineGuid                    Type: byte[16]
    Name: uniqueidentifier               Type: byte[ ]
    Name: friendlyName                   Type: string
    Name: volumeSize                      Type: integer
machineGuid is the GUID of the client whose data is returned.

uniqueIdentifier, friendlyName and volumeSize are values from a previous VolumeConfig request.

---

Name: EndVolumeConfigs                   Type: response
Description: The backup server sends one of these messages after the last VolumeConfig response to a GetVolumeConfigs request.
Message code: −18
Prestate:
    AwaitingVolumeConfigs
Poststate:
    Idle
Parameters: (none)

---

Name: GetBackupSets                       Type: request
Description: The client sends one of these messages to determine what backup sets exist for a machine. In response, the backup server will send a sequence of BackupSet responses followed by an EndBackupSets response.
Message code: 18
Prestate:
    Idle
Poststate:
    AwaitingBackupSets
Parameters:
    Name: machineGuid                    Type: byte[16]
machineGuid is the identifier of the client whose data is desired.

---

Name: BackupSet                            Type: response
Description: In response to a GetBackupSets request, the backup server sends one of these messages for each backup set in the database.
Message code: −19
Prestate:
    AwaitingBackupSets
Poststate: (unchanged)
Parameters:
    Name: machineGuid                    Type: byte[16]
    Name: index                              Type: integer
    Name: timestamp                      Type: integer
    Name: authNeeded                    Type: boolean
    Name: isComplete                    Type: boolean
    Name: isDaily                         Type: boolean
    Name: isWeekly                       Type: boolean
    Name: isMonthly                    Type: boolean
    Name: isYearly                      Type: boolean
    Name: volumeCount                 Type: integer
    Name: friendlyName                 Type: string
machineGuid is the GUID of the client whose data is returned.

index is the 1-based index of the backup set described by this message.
timestamp is the time at which the backup was started, in FileTime format (number of decimicroseconds since 1 January 1601, 0000 UTC).
authNeeded is true if the client will need to authenticate himself as a backup server administrator before being allowed to do a restore.
isComplete is true if this backup set was completed (via EndBackupSet request and response).
isDaily is true if this is the machine's first backup set of the day.
isWeekly is true if this is the machine's first backup set of the week.
isMonthly is true if this is the machine's first backup set of the month.
isYearly is true if this is the machine's first backup set of the year.
volumeCount is the number of volumes contained in the backup set.
friendlyName is the friendly name of one of the volumes in the backup set.
This field occurs exactly volumeCount times.

---

Name: EndBackupSets                       Type: response
Description: The backup server sends one of these messages after the last BackupSet response to a GetBackupSets request.
Message code: −20
Prestate:
    AwaitingBackupSets
Poststate:
    Idle
Parameters: (none)

---

Name: GetVolumes                           Type: request
Description: The client sends one of these requests to find out what volumes exist in the database for a particular client machine. In response, the backup server will send a sequence of Volume responses followed by an EndVolumes response.
Message code: 19
Prestate:
    Idle
Poststate:

-continued

```
AwaitingVolumes
Parameters:
    Name: machineGuid               Type: byte[16]
    Name: backupSetIndex            Type: integer
machineGuid is the GUID of the client whose data is desired.
``` backupSetIndex is the index of the backup set whose data is desired.

```
Name: Volume                        Type: response
Description: In response to a GetVolumes request, the backup server
sends one of these responses for each volume associated with a
particular machine.
Message code: −21
Prestate:
    AwaitingVolumes
Poststate: (unchanged)
Parameters:
    Name: machineGuid               Type: byte[16]
    Name: backupSetIndex            Type: integer
    Name: uniqueIdentifier          Type: byte[ ]
    Name: friendlyName              Type: string
    Name: fileSystem                Type: string
    Name: volumeSerial              Type: integer
    Name: bytesPerSector            Type: integer
    Name: bytesPerCluster           Type: integer
    Name: initialVolumeBytes        Type: integer
    Name: minimumRestoreBytes       Type: integer
    Name: usedClusterCount          Type: integer
    Name: isActive                  Type: boolean
    Name: clientInfo                Type: byte[ ]
machineGuid is the GUID of the client whose data is returned.
``` backupSetIndex is the index of the backup set whose data is returned.

uniqueIdentifier, friendlyName, fileSystem, volumeSerial, bytesPerSector, bytesPerCluster and isActive are the values from the associated BeginBackup request.

minimumRestoreBytes and clientInfo are the values from the associated EndBackup request.

usedClusterCount is a count of the number of clusters stored in the backed-up volume image.

```
Name: EndVolumes                    Type: response
Description: The backup server sends one of these responses after
sending its last Volume response.
Message code: −22
Prestate:
    AwaitingVolumes
Poststate:
    Idle
Parameters: (none)
Name: BeginNtlmAuth                 Type: request
Description: The client sends this request to begin an NTLM
authentication. After some number of ContinueNtlmAuth responses
and requests, the backup server will respond with Authorized,
NotAuthorized or AuthFailed.
Message code: 20
Prestate:
    Idle
Poststate:
    AwaitingNtlmResponse
Parameters:
    Name: authData                  Type: byte[ ]
authData is the data returned by InitializeSecurityContext, a
function for estabishing a security context between two devices, or
the like.
```

```
Name: ContinueNtlmAuth              Type: request
Description: The client sends this request after receiving a
ContinueNtlmAuth response.
Message code: 21
Prestate:
    AwaitingNtlmRequest
Poststate:
    AwaitingNtlmResponse
Parameters:
    Name: authData                  Type: byte[ ]
authData is the data returned by InitializeSecurityContext or
the like.
```

```
Name: ContinueNtlmAuth              Type: response
Description: The backup server sends this response to either a
BeginNtlmAuth or a ContinueNtlmAuth request, when more
interactions are needed to complete the authentication.
Message code: −23
Prestate:
    AwaitingNtlmResponse
Poststate:
    AwaitingNtlmRequest
Parameters:
    Name: authData                  Type: byte[ ]
authData is the data returned by AcceptSecurityContext
```

```
Name: SimpleAuth                    Type: request
Description: The client sends this request to perform a simple (plain-
text) authentication. The backup server will send an Authorized,
NotAuthorized or AuthFailed response.
Message code: 22
Prestate:
    Idle
Poststate:
    AwaitingSimpleAuth
Parameters:
    Name: userName                  Type: string
    Name: password                  Type: string
    Name: domainName                Type: string
```

```
Name: Authorized                    Type: response
Description: The backup server sends this response to indicate that
authentication was successful, and the supplied credentials are
sufficient to authorize a restore operation.
Message code: −24
Prestate:
    AwaitingNtlmResponse
    AwaitingSimpleAuth
Poststate:
    Idle
Parameters: (none)
```

```
Name: NotAuthorized                 Type: response
Description: The backup server sends this response to indicate that
authentication was successful, but the supplied credentials are
insufficient to authorize a restore operation.
Message code: −25
Prestate:
    AwaitingNtlmResponse,
    AwaitingSimpleAuth
```

-continued

Poststate:
    Idle
Parameters: (none)

---

Name: AuthFailed    Type: response
Description: The backup server sends this response to indicate that authentication was unsuccessful, typically usually because the user name or password was incorrect.
Message code: −26
Prestate:
    AwaitingNtlmResponse
    AwaitingSimpleAuth
Poststate:
    Idle
Parameters: (none)

---

Name: BeginRestore    Type: request
Description: The client sends this request to start a restore operation. In response, the backup server will send zero or more Waiting responses followed by zero or more Working responses, followed by either a BeginRestore or a BeginRestoreFailed response.
Message code: 23
Prestate:
    Idle
Poststate:
    AwaitingBeginRestore
Parameters:
    Name: machineGuid    Type: byte[16]
    Name: backupSetIndex    Type: integer
    Name: uniqueIdentifier    Type: byte[ ]

machineGuid is the GUID of the machine whose data is to be restored.
    backupSetIndex is the index of the backup set whose data is to be restored.
    uniqueIdentifier is the unique identifier of the volume whose data is to be restored.

---

Name: BeginRestore    Type: response
Description: The backup server sends this response upon successful preparation for a restore operation.
Message code: −27
Prestate:
    AwaitingBeginRestore
Poststate:
    Restoring
Parameters: (none)

---

Name: BeginRestoreFailed    Type: response
Description: The backup server sends this response when an attempt to begin a restore operation has failed.
Message code: −28
Prestate:
    AwaitingBeginRestore
Poststate:
    Idle
Parameters:
    Name: reason    Type: string
reason is a description of why the request failed. It is localized in the locale specified by the ProtocolVersion request.

---

Name: GetClusters    Type: request
Description: The client sends this request to ask the backup server to send the contents of a range of clusters. The backup server will respond with a series of ClusterData, ClusterDataBad and/or ClusterDataMissing responses that cover the requested range, in strictly increasing order. Note that the client may send a second GetClusters request before the first one has been satisfied. The backup server will typically respond with all of the data for the first request, then all of the data for the second one.
Message code: 24
Prestate:
    Restoring
Poststate: (unchanged)
Parameters:
    Name: firstClusterIndex    Type: integer
    Name: clusterCount    Type: integer

---

Name: ClusterData    Type: response
Description: The backup server sends a ClusterData response to send the contents of a single cluster to the client, in response to a GetClusters request.
Message code: −29
Prestate:
    Restoring
Poststate: (unchanged)
Parameters:
    Name: clusterIndex    Type: integer
    Name: clusterData    Type: byte[ ]

---

Name: ClusterDataBad    Type: response
Description: The backup server sends a ClusterDataBad response to the client to indicate that the contents of a range of clusters is unavailable, typically because of I/O errors or other failures. The specified range will be a subrange of that in the GetClusters request.
Message code: −30
Prestate:
    Restoring
Poststate: (unchanged)
Parameters:
    Name: clusterIndex    Type: integer
    Name: clusterCount    Type: integer

---

Name: ClusterDataMissing    Type: response
Description: The backup server sends a ClusterDataMissing response to the client to indicate that the contents of a range of clusters was not included in the backup image (because, for example, the clusters were not in use by any file). The specified range will be a subrange of that in the GetClusters request.
Message code: −31
Prestate:
    Restoring
Poststate: (unchanged)
Parameters:
    Name: clusterIndex    Type: integer
    Name: clusterCount    Type: integer

---

Name: EndRestore    Type: request
Description: The client sends an EndRestore request when it has successfully finished a restore operation.
Message code: 25
Prestate:

-continued

```
Restoring
Poststate:
    AwaitingEndRestore
Parameters: (none)
```

```
Name: EndRestore                        Type: response
Description: The backup server sends an EndRestore response to
reply to an EndRestore request.
Message code: −32
Prestate:
    AwaitingEndRestore
Poststate:
    Idle
Parameters: (none)
```

```
Name: SetBackupSchedule                 Type: request
Description: The client sends a SetBackupSchedule request to
inform the backup server of the expected schedule for backup
operations.
Message code: 26
Prestate:
    Idle
Poststate:
    AwaitingSetBackupScheduleResponse
Parameters:
    Name: machineGuid                   Type: byte[16]
    Name: machineName                   Type: string
    Name: machineDescription            Type: string
    Name: scheduleDays                  Type: integer
    Name: scheduleMinutes               Type: integer
machineGuid is the client-chosen GUID for the current machine.
``` machineName is a name for the current machine.
machineDescription is a description string for the current machine.
scheduleDays is an integer bit-mapped field describing on which days backup is scheduled to run, as follows:
  1- Sunday
  2- Monday
  4- Tuesday
  8- Wednesday
  16- Thursday
  32- Friday
  64- Saturday
scheduleMinutes is the number of minutes after midnight, local time, that backup is scheduled to run.

```
Name: SetBackupSchedule                 Type: response
Description: The backup server sends a SetBackupSchedule
response to reply to a SetBackupSchedule request.
Message code: −33
Prestate:
    AwaitingSetBackupScheduleResponse
Poststate:
    Idle
Parameters: (none)
```

In one example, the various data types used by protocol messages are structured and transmitted as follows:

Integers—An integer is transmitted using a variable number of bytes; the smallest possible integer is sent as one byte while the largest possible 64-bit integer is sent as 10 bytes. The least significant 7 bits of the value are sent in the first byte; the most significant 0x80 bit is set if more bytes are to follow. If the integer's value is in the range [−64 . . . +63], then the integer comprises only one byte. Otherwise, the 0x80 bit is set in the first byte. Subsequent bytes each encode successive 7 bits of the value. In each byte except the last one, the 0x80 bit is set. In the last byte, the 0x40 bit is treated as a sign bit; this bit is repeated as necessary to fill out the length of the integer.

Booleans—A boolean false is transmitted as a single byte with value 0; a boolean true is transmitted as a single byte with value 1. (Note that this is the same encoding as an Integer 0 or 1.)

Fixed-length byte arrays—A fixed-length byte array is transmitted as the bytes of the array, with the lowest-indexed byte first. Since it's a fixed-length array, the receiver (by definition) knows how many bytes to expect. A fixed-length byte array containing, for example, 16 bytes is indicated herein by "byte[16]". MD5 hashes, for example, tend to be 16 bytes long and transmitted as fixed-length byte arrays.

Variable-length byte arrays—A variable-length byte array is transmitted by sending the byte count, encoded as an integer as described above, followed by the contents of the array, lowest index first. A variable-length byte array is indicated herein by "byte [ ]".

String—a string is transmitted as an integer containing the count of characters in the string followed by the characters of the string. In one example, the count and string characters are represented as bytes in universal character set transformation format 8 ("UTF-8").

Message—Each message has a unique message code, which is transmitted first, encoded as an integer as described above. This is followed by the fields of the message; the types of these fields depend on the specific message.

Figure 4:
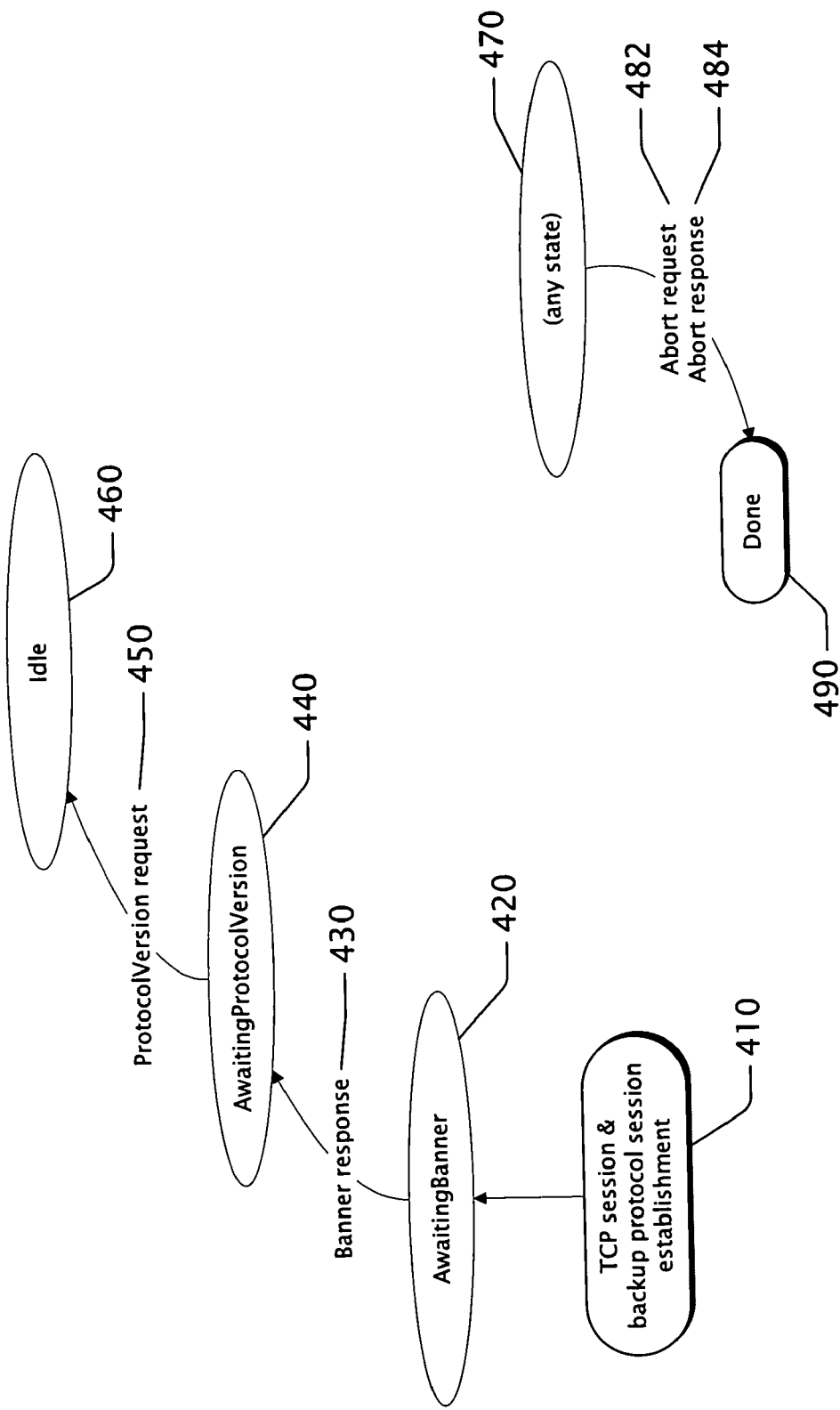
FIG. 4 is a block diagram showing example protocol state transitions and messages for backup protocol session establishment and abort operations.

FIG. 4 is a block diagram showing example protocol state transitions and messages for backup protocol session establishment and abort operations. The state transitions and message are based on the example protocol state and message sets described above. To establish a protocol session between a client and a backup server, the client sends the DiscoverServers request and receives a ServerHere reply from a backup server, as described above. Given the ServerHere reply, the client establishes a TCP connection with the backup server via example port number 8912. At this point the client and server have established a backup protocol session.

Once a client establishes a TCP session and backup protocol session 410 with a backup server, the protocol enters AwaitingBanner state 420. Once in AwaitingBanner state 420, the backup server sends a Banner response message 430 to the client including a currentVersion parameter indicating the latest version of the protocol that the backup server understands, and a lowestversion parameter indicating the oldest version of the protocol the backup server understands. After sending Banner response 430, the protocol enters AwaitingProtocolVersion state 440.

In response to Banner response 430 sent by the backup server, the client sends a ProtocolVersion request 450 to the backup server to indicate the version of the protocol to be used for the protocol session, which is typically in the range indicated by the currentversion and lowestversion parameters provided by Banner response 430. At this point the protocol transitions to Idle state 460 and is ready for normal operation.

At any state during a protocol session, as indicated by block 470, the client may send an Abort request 482 to the backup server indicating that a failure has occurred such that the client cannot continue the protocol session. The client typically closes the backup protocol TCP session on its end after sending an Abort request 482, and the backup protocol session between the client and backup server is terminated as indicated by block 490. The backup server typically closes the backup protocol TCP session on its end upon receipt of an Abort request 482.

Similarly, should the backup server experience a failure such that it cannot continue the protocol session, it may send an Abort response 484 to the client during any protocol state, as indicated by block 470. The backup server typically closes the backup protocol TCP session on its end after sending an Abort response 484, and the backup protocol session between the client and backup server is terminated as indicated by block 490. The client typically closes the backup protocol TCP session on its end upon receipt of an Abort response 484.

Figure 5:
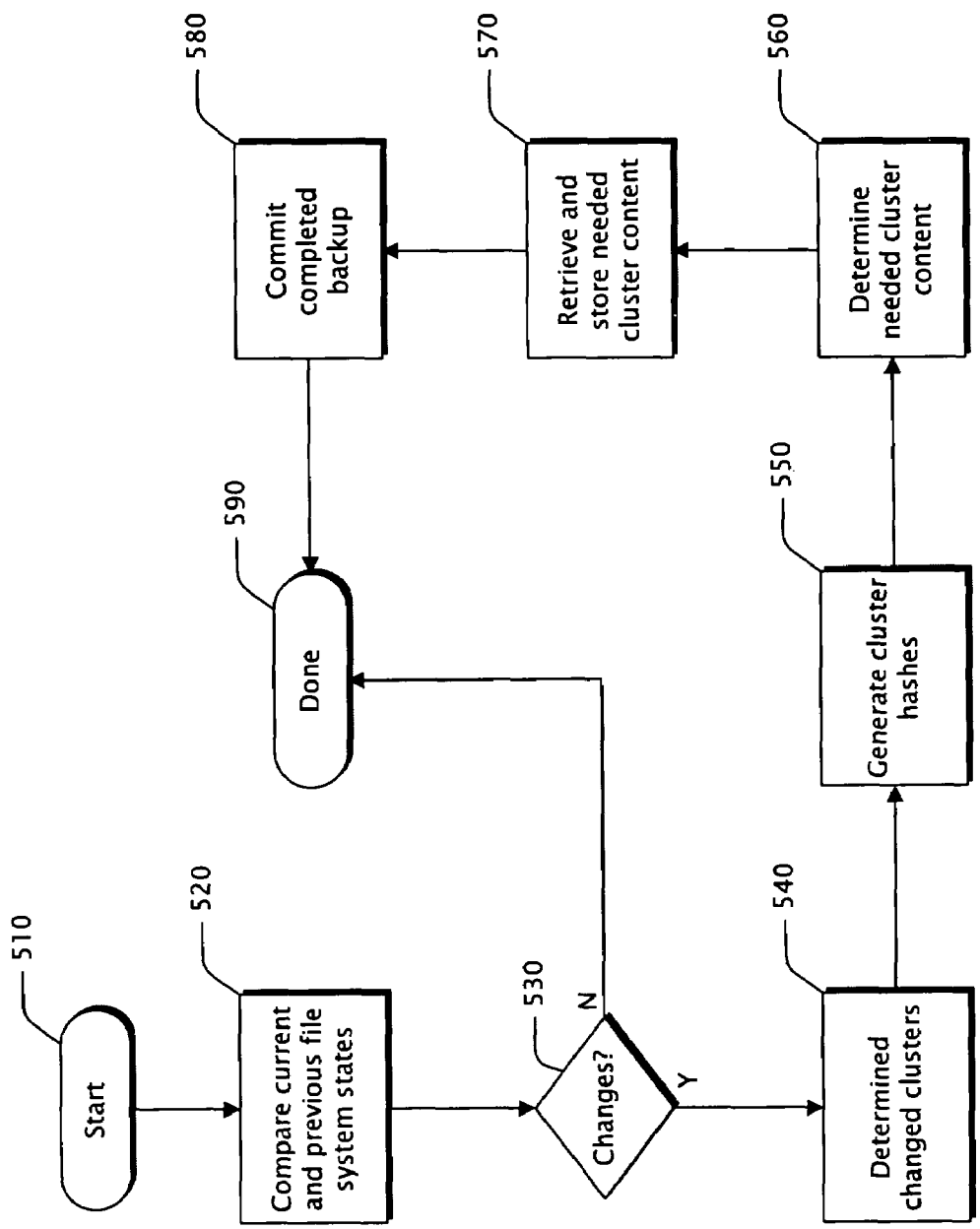
FIG. 5 is a block diagram showing a simplified example backup process for performing a cluster-based backup.

FIG. 5 is a block diagram showing a simplified example backup process for performing a cluster-based backup. The process begins at block 520 by comparing the state of a file system to be backed up to a previously stored state of the same file system, if any. A previous state of the file system is typically stored by the backup system as a part of any previous backup operation. Typically the file system is that of a single volume or a set of volumes. The state of the file system includes data and metadata in the file system such as cluster contents, file records, files, folders, and any other file system data. Comparing the states determines if anything has changed in the file system relative to the file system's previous state, such as a file being modified, added, deleted, a folder being added, a file or folder timestamp, such as the last modified date, being changed, or the like. If there is no previous state available, then the entire file system is considered to have changed since it was not previously known. Such a backup, with no previous state available, is known as a "complete" backup indicating that the file system is completely backed up. Alternatively, when some of the file system data is already backed up by the backup system, then an "incremental" backup is performed.

In one example, the file system is linearly scanned, hashing each file record and checking for changes relative to the previous state. The set of current file record hashes generated is provided to the backup system for future use. The file record hashes may be generated using a hashing function, such as an MD5 hashing function.

At block 530, if no changes to the file system are detected, then the backup process is complete as there is nothing new to backup since the previous file system state was backed up. If, on the other hand, there is some difference between the current and previous file system states, then the process continues at block 540. In one example this check may not occur as it tends to be unlikely in modern file systems to not have changes, even over a very brief period of time.

At block 540, the specific clusters that have changed, or that may have changed, are determined. In one example, this is done by noting that a file record has changed as part of comparing the current and previous file system states. Given a changed file record, the clusters associated with the changed file record are determined. One or more of the associated clusters may have changed since the previous backup as indicated by the changed file record which indicates that there has been some change to the file, folder, or other data represented by the file record.

Volume clusters may be categorized into one of three categories. 1) "Uninteresting clusters": these are clusters that are currently not allocated for use by the file system or clusters associated with ephemeral files that typically need not be included in a backup. 2) "Unchanged clusters": these are clusters that are not in the first category, and associated with files for which the file system metadata indicates that file contents have not changed. 3) "Potentially changed clusters": these are clusters that are in neither the first nor second category; they represent clusters that may have changed since the previous backup.

At block 550, a "current cluster hash" is generated for each cluster in the file system that may have changed—the potentially changed clusters. In one example, this is done by using a hashing function, such as an MD5 hashing function. In another example, the current cluster hashes and a list of unchanged clusters provided to the backup system. The backup system compares each current cluster hash to the corresponding cluster hash of the previous backup, if any, and creates a set of cluster and hash pairs for which the cluster contents have changed since the previous backup and sorts the set into hash order.

At block 560, the current cluster hashes are compared to cluster hashes already stored by the backup system. There is typically one such stored cluster hash for each cluster backed up by the backup system. For example, if the backup system includes backups of 10 different clients, then the current cluster hashes are compared again the stored cluster hashes of all 10 different clients. If a match is found, that is, a current cluster hash is the same as a stored cluster hash, then the content for the current cluster hash is not needed as it is already stored by the backup system. Any current cluster hash for which there is not a matching stored cluster hash represents a cluster's content that is not currently stored by the backup system, and is therefore considered needed.

At block 570, the needed cluster contents are retrieved from the file system being backed up and stored by the backup system. Once all needed cluster content has been retrieved and stored, the entire backup is committed, as indicated by block 580, and the process is complete. An example commit process is described in connection with FIG. 16.

Figure 6:
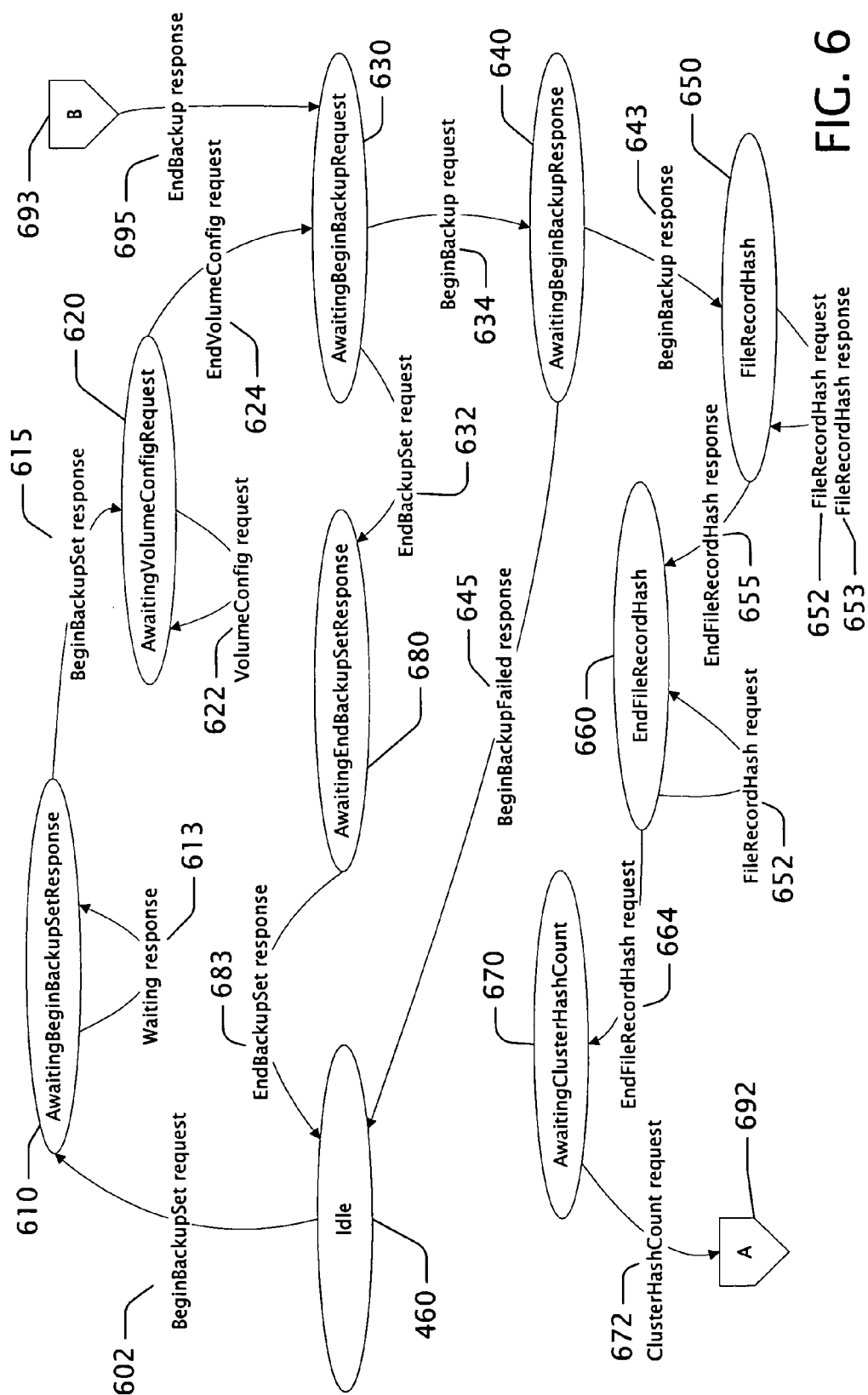
FIG. 6 is a block diagram showing example protocol state transitions and messages for performing a cluster-based backup operation during a protocol session.

FIG. 6 is a block diagram showing example protocol state transitions and messages for performing a cluster-based backup operation during a protocol session. The state transitions are based on the example protocol states and messages described above. Starting at Idle state 460, the client in the protocol session sends a BeginBackupSet request 602 to the backup server including a computerGuid parameter uniquely identifying the client. The protocol then enters AwaitingBeginBackupResponse state 620. The backup server may send one or more Waiting responses 613 to the client if there will be a delay in performing the requested operation. When the backup server is able to begin a new backup set for the client, it sends a BeginBackupSet response 615 to the client and the protocol transitions to AwaitingvolumeConfigRequest state 620. A backup set is typically a backup of one or more volumes.

Upon client receipt of BeginBackupSet response 615, the client sends zero or more VolumeConfig requests 622 to the backup server, each request including a uniqueIdentifier parameter that uniquely identifies a volume that the backup server is to maintain information about. After the client has identified zero or more volumes to the backup server, it sends an EndVolumeConfig request 624 to the backup server and the protocol transitions to AwaitingBeginBackupRequest state 630 indicating that a backup set has begun, but no individual volume backup operation is currently in progress. This state may also be entered via an EndBackup response 695 as indicated in FIGS. 6 and 7 by block 693.

While the protocol is in AwaitingBeginBackupSet state 630, the client may send an EndBackupSet request 632 indicating that the last volume backup in a backup set of zero or more backups has been completed, resulting in transitioning the protocol state to AwaitingEndBackupSetResponse state

680. In response to the EndBackupSet request 632 from the client, the server sends an EndBackupSet response 683 to the client and the protocol transitions back to Idle state 460. Alternatively, while the protocol is in AwaitingBeginBackupSet state 630, the client may send a BeginBackup request 634 to the backup server, the request 634 including a uniqueIdentifier parameter that uniquely identifies the client volume to be backed up. Reception of the BeginBackup request 634 by the backup server transitions the protocol to AwaitingBeginBackupResponse state 640.

In the event that the backup server is unable to initiate a backup operation responsive to BeginBackup request 634, it sends a BeginBackupFailed response 645 to the client. Response 645 includes a reason parameter that identifies the reason for the failure. Following the sending of a BeginBackupFailed response 645, the protocol returns to Idle state 460. Alternatively, if and when the backup server is able to begin the backup operation, it sends a BeginBackup response 643 to the client and the protocol transitions to FileRecordHash state 650.

While the protocol is in FileRecordHash state 650, the backup server sends one FileRecordHash response 653 to the client including a hash of each file record previously provided to the backup server by the client at the time of the last backup, if any. These files record hashes may be used by the client to determine what files on the client may have changed since the last backup. Once all such file record hashes have been sent to the client, the backup server sends an EndFileRecordHash response 655 and the protocol transitions to.

While the protocol is in either FileRecordHash state 650 or EndFileRecordHash state 660, the client scans the volume to be backed up and computes hashes for each file record, compares these current file records hashes to those sent by the backup server via FileRecordHash responses 653 to determine which may have changed since the last backup, and sends each changed file record hash to the backup server using a FileRecordHash request 652. Once all of the changed file record hashes are sent by the client, and the protocol has transitioned to EndFileRecordHash state 660, the client sends an EndFileRecordHash request 664 and the protocol transitions to AwaitingClusterHashCount state 670.

Once the protocol is in AwaitingClusterHashCount state 670, the client sends a ClusterHashCount request 672 indicating the maximum number of ClusterHash requests (FIG. 7a, 712) that will be sent. At this point the protocol transitions to ClusterHash state 710, as shown in FIG. 7a via figure transition indicator 692.

FIG. 7a is a block diagram showing a continuation of example protocol state transitions and messages for performing a cluster-based backup operation. While the protocol is in ClusterHash state 710, the client sends a cluster hash to the backup server via a ClusterHash request 712 for each in-use cluster on the volume that has changed since the last backup. The client also sends zero or more ClustersUnchanged requests 714 to the backup server, each request 714 identifying a contiguous run of in-use clusters that have not changed since the last backup. Once the client has sent all the ClusterHash requests 712 and ClustersUnchanged requests 714, it sends an EndClusterHashes request 716 to the backup server and the protocol transitions to BackupWorking state 720.

While the protocol is in BackupWorking state 720, the backup server may send one or more Working responses 723, indicating that it is currently busy working on an operation. When not busy while in BackupWorking state 720, the backup server sends a NeedClusterCount response 725 to the client indicating an upper bound on the total number of clusters for which contents will be requested via NeedClusterData responses 733. Once the NeedClusterCount response 725 has been sent to the client, the protocol transitions to BackupClusterData state 730.

While the protocol is in BackupClusterData state 730, the backup server sends zero of more NeedClusterData responses 733 for the clusters contents required for backup. In one example, one request 733 is sent for each contiguous range of clusters for which the content is needed for backup. Once all NeedClusterData responses 733 have been sent to the client, the backup server sends an EndNeedClusterData response 735 to the client and the protocol transitions to AwaitingEndBackupRequest state 740.

While the protocol is in either BackupClusterData state 730 or AwaitingEndBackupRequest state 740, the client sends cluster contents to the backup server via ClusterData requests 732. Once all ClusterData requests 732 have been sent to the backup server, and the protocol has transitioned to AwaitingEndBackupRequest state 740, the client sends an EndBackup request 744 to the backup server, requesting the backup server to commit the backup operation, and the protocol transitions to AwaitingEndBackupResponse state 750. An example commit process is described in connection with FIG. 16.

While the protocol is in AwaitingEndBackupResponse state 750 the backup server commits the backup operation and may send a Working response to the client indicating that it is busy with an operation such as the commit. When not busy, the backup server sends an EndBackup response 695 to the client and the protocol transitions to AwaitingBeginBackup state 630 as shown in FIG. 6 and the backup operations continue as described above for state 630 where the backup set is ended or another volume in the backup set is backed up.

FIG. 7b is a block diagram showing example protocol state transitions and messages for discovering client machines that have one or more backups in a backup server's database ("backup database" or "database"). A backup server may backup multiple clients and thus contain backups for each of those multiple clients in its backup database. The state transitions, client requests and backup server responses shown in FIG. 7b provide one example of how to discover what client machines have backup in a backup database using the protocol states and messages detailed above.

The machine discovery process may begin when the protocol is in Idle state 460. At this point, a client may send a GetMachines request 762 to the backup server, upon receipt of which the protocol transitions to AwaitingMachines state 760. While the protocol is in state 760, the backup server sends zero or more Machine responses 763, each response including a machineGuid parameter that uniquely identifies a machine with a backup in the backup database. Once all of the Machine responses 763 are sent to the client, the backup server sends an EndMachines response 765 to the client and the protocol transitions back to Idle state 460.

Figure 8A:
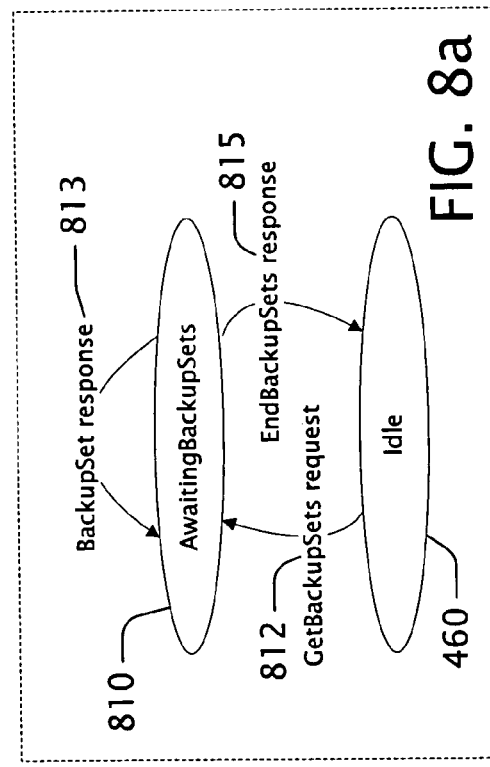
FIG. 8a is a block diagram showing example protocol state transitions and messages for discovering any backup sets for a particular machine that are stored in a backup server's database.

FIG. 8a is a block diagram showing example protocol state transitions and messages for discovering any backup sets for a particular machine that are stored in a backup server's database. A backup database may include multiple backup sets for a particular machine, each backup set having been created at a different point in time. For example, a backup database may include two backup sets for machine A: the first having been created on January $10^{th}$ starting at 9:30 pm and the second having been created on February $10^{th}$ starting at 11:00 pm.

The backup set discovery process may begin when the protocol is in Idle state 460. At this point, a client may send a GetBackupSets request 812 to the backup server, the request including a machineGuid parameter that uniquely identifies a machine. Upon receipt of the GetBackupSets request 812 by the backup server the protocol transitions to AwaitingBackupSets state 810. While the protocol is in state 810, the backup server sends zero or more BackupSet responses 813, each response including a friendlyName parameter that uniquely identifies a backup set for the machine. Once all of the BackupSet responses 813 are sent to the client, the backup server sends an EndBackupSets response 815 to the client and the protocol transitions back to Idle state 460.

Figure 8B:
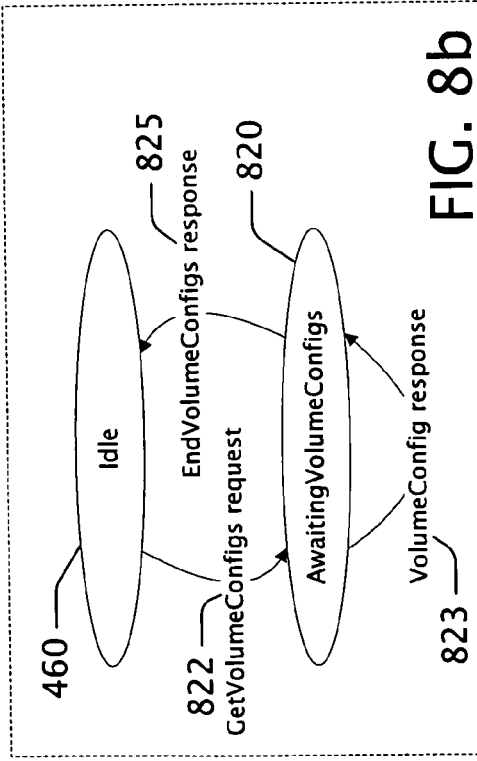
FIG. 8b is a block diagram showing example protocol state transitions and messages for discovering any volume configurations for a particular machine that are stored in a backup server's database.

FIG. 8b is a block diagram showing example protocol state transitions and messages for discovering any volume configurations for a particular machine that are stored in a backup server's database. A volume configuration is a description of a volume associated with a specific client machine. A backup database may include multiple volume configurations for a particular machine. For example, a backup database may include two volume configurations machine A: the first having been created for a 200 GB volume named "Main Volume" and the second for a 100 GB volume named "Second Volume".

The volume configurations discovery process may begin when the protocol is in Idle state 460. At this point, a client may send a GetVolumeConfigs request 822 to the backup server, the request including a machineGuid parameter that uniquely identifies a machine. Upon receipt of the GetVolumeConfigs request 822 by the backup server the protocol transitions to AwaitingvolumeConfigs state 820. While the protocol is in state 820, the backup server sends zero or more VolumeConfig responses 823, each response including a friendlyName parameter that uniquely identifies a volume associated with the machine. Once all of the VolumeConfig responses 823 are sent to the client, the backup server sends an EndVolumeConfigs response 825 to the client and the protocol transitions back to Idle state 460.

Figure 8C:
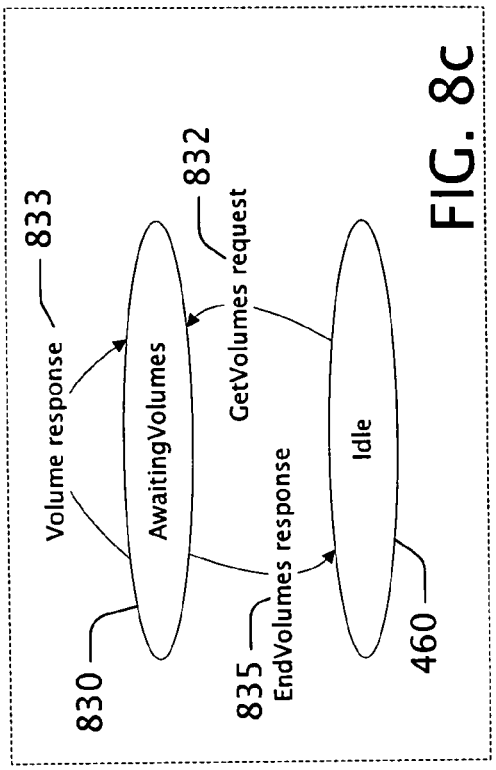
FIG. 8c is a block diagram showing example protocol state transitions and messages for discovering any volume backups in a specific backup set for a particular machine that are stored in a backup server's database.

FIG. 8c is a block diagram showing example protocol state transitions and messages for discovering any volume backups in a specific backup set for a particular machine that are stored in a backup server's database. A volume backup is a backup of a particular volume. A backup database may include backups of multiple different volumes in a specific backup set for a particular machine. For example, a backup database may include two different volume backups in the backup set created on January $10^{th}$ starting at 9:30 pm for machine A: the first volume backup for a 200 GB volume named "Main Volume" and the second for a 100 GB volume named "Second Volume".

The volume backup discovery process may begin when the protocol is in Idle state 460. At this point, a client may send a GetVolumes request 832 to the backup server, the request including a machineGuid parameter that uniquely identifies a machine and a backupSetIndex parameter that uniquely identifies a specific backup set for the machine. Upon receipt of GetVolumes request 832 by the backup server the protocol transitions to AwaitingVolumes state 830. While the protocol is in state 830, the backup server sends zero or more Volume responses 833, each response including a friendlyName parameter that uniquely identifies a volume backup in the backup set of the machine. Once all of the Volume responses 823 are sent to the client, the backup server sends an EndVolumes response 835 to the client and the protocol transitions back to Idle state 460.

Figure 8D:
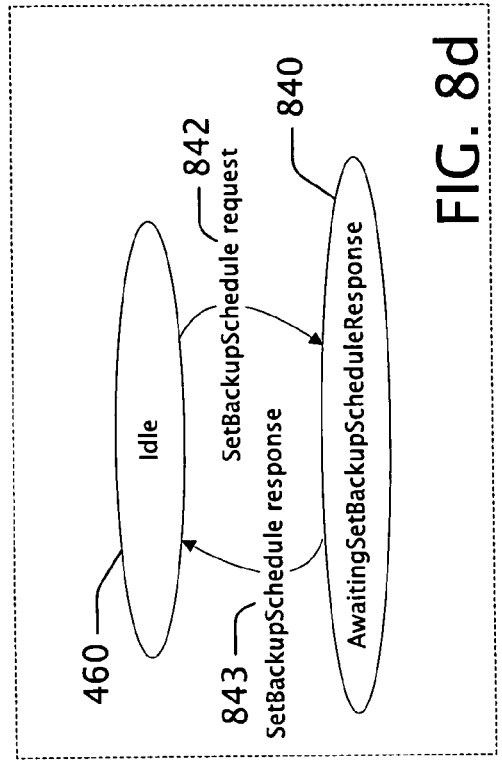
FIG. 8d is a block diagram showing example protocol state transitions and messages for establishing a backup schedule for a particular machine.

FIG. 8d is a block diagram showing example protocol state transitions and messages for establishing a backup schedule for a particular machine. Such a backup schedule may be stored in a backup server's database. For example, a schedule may be established to perform a backup of a particular machine every other day starting at 11:30 pm.

The establishment of a backup schedule may begin when the protocol is in Idle state 460. At this point, a client machine may send a SetBackupSchedule request 842 to the backup server, the request including a machineGuid parameter that uniquely identifies the machine and scheduleDays and scheduleMinutes parameters that identify specific days of the week and a time to start a backup operation on the machine. Upon receipt of SetBackupSchedule request 842 by the backup server the protocol transitions to AwaitingSetBackupScheduleResponse state 840. While the protocol is in state 840, the backup server sends a SetBackupSchedule response 843 indicating the backup schedule for the machine has been established and stored in the backup database. Once the SetBackupSchedule response 843 is sent to the client the protocol transitions back to Idle state 460.

Figure 9:
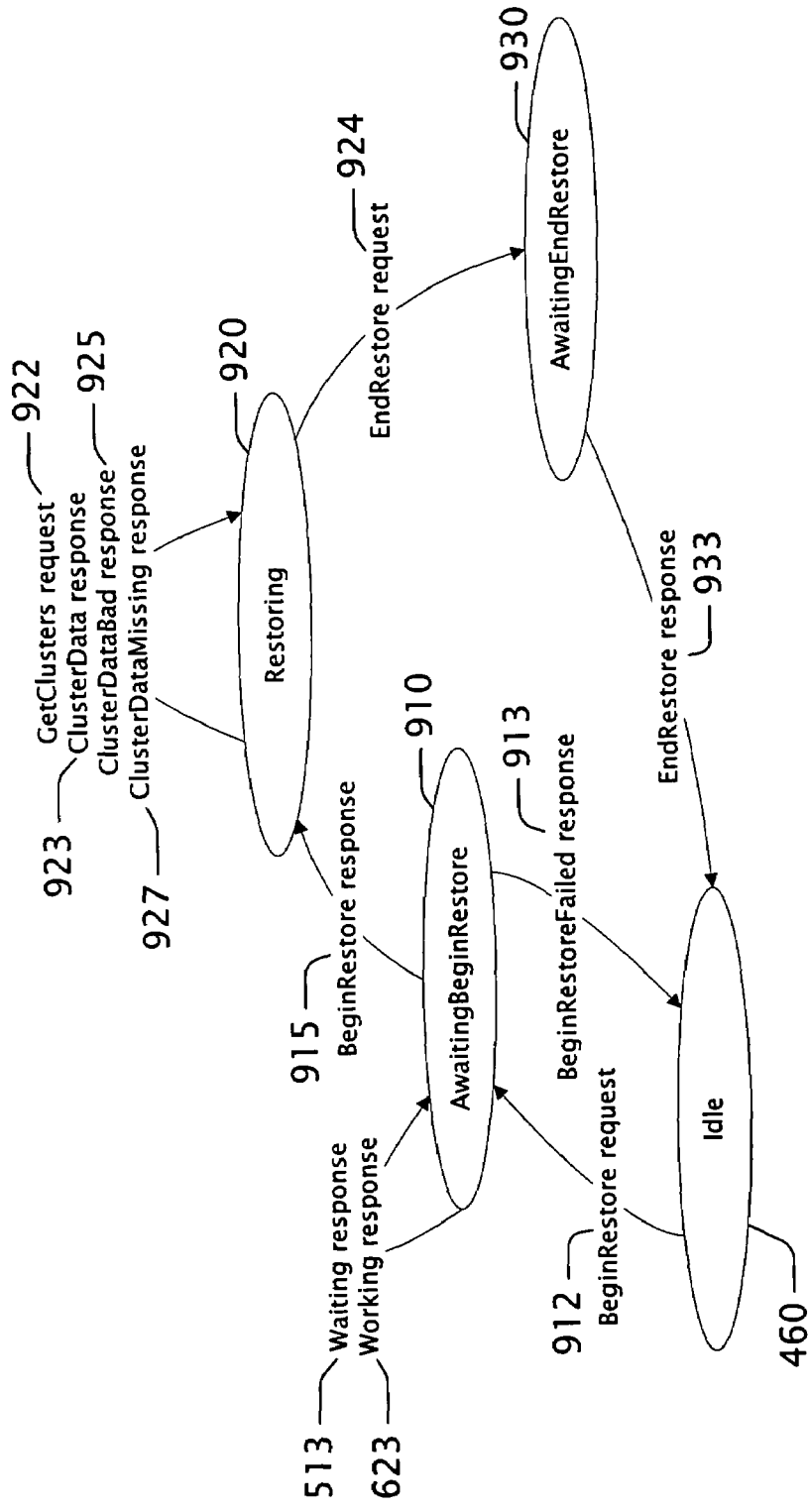
FIG. 9 is a block diagram showing example protocol state transitions and messages for restoring a particular machine.

FIG. 9 is a block diagram showing example protocol state transitions and messages for restoring a particular machine. For example, a restore may be performed using a backup set created on January $10^{th}$. Or, only the volume on a machine named "Main Volume" may be restored from a backup set created on July $23^{rd}$.

The restore process may begin when the protocol is in Idle state 460. At this point, a client may send a BeginRestore request 912 to the backup server, the request including a machineGuid parameter that uniquely identifies a machine, a backupSetIndex parameter that uniquely identifies a specific backup set for the machine, and a uniqueIdentifier that uniquely identifies a volume in the backup set. Upon receipt of BeginRestore request 912 by the backup server, the protocol transitions to AwaitingBeginRestore state 910.

While the protocol is in AwaitingBeginRestore state 910, the backup server may send one or more Waiting responses 613 to the client if there will be a delay in performing the requested operation. The backup server may also send one or more Working responses 623, indicating that it is currently busy working on an operation. While the protocol is in to AwaitingBeginRestore state 910, if unable to perform the requested restore operation due to a failure, the backup server sends a BeginRestoreFailed response 913 including a reason parameter describing the reason for the failure. Otherwise, when not delayed or busy while in AwaitingBeginRestore state 910, the backup server sends a BeginRestore response 915 to the client and the protocol transitions to Restoring state 920.

While the protocol is in Restoring state 920, the client sends zero or more GetClusters requests 922 to the backup server, each request requesting the backup server to send backed-up data. In once example, GetClusters request 922 requests the backup server to send the backed-up contents of a range of clusters. In response to each request 922, the backup server sends a ClusterData response 923 including at least a portion of the requested cluster contents. The backup server may also send a ClusterDataBad response 925 indicating that at least a portion of the requested cluster contents is unavailable for some reason, such as due to an input/output ("I/O") error or the like. The backup server may also send a ClusterDataMissing response 927 indicating that at least a portion of the requested cluster contents was not included in the backup for some reason, such as the clusters where not in use on the machine at the time of the backup, or the like. While the protocol is in Restoring state 920, and once all GetClusters request 922 have been sent, the client sends an EndRestore request 924 to the backup server and the protocol transitions to AwaitingEndRestore state 930.

While the protocol is in AwaitingEndRestore state 930, the backup server sends an EndRestore response 933 to the client indicating that all requested cluster contents have been sent.

Once the EndRestore response 933 has been sent to the client the protocol transitions back to Idle state 460 and the requested restore operation is complete.

Figure 10:
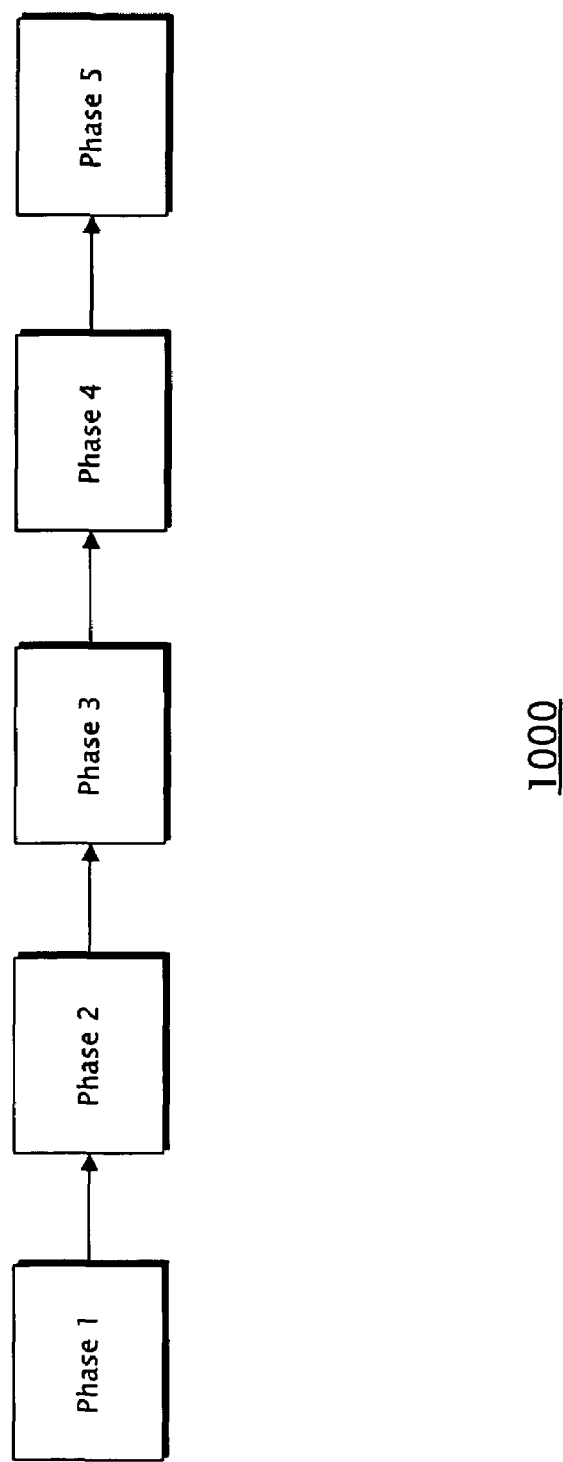
FIG. 10 is a block diagram showing example phases of a 5 phased cluster-based backup operation.

FIG. 10 is a block diagram showing example phases of a 5 phased cluster-based backup operation. FIGS. 11-15 are block diagrams showing an example cluster-based backup operation. The simplified example backup process described in connection with FIG. 5 and the protocol state transitions and messages described in connection with FIGS. 6 and 7 can be further described as an example 5-phase cluster-based backup operation as shown in FIGS. 11-15, the operation being divided into 5 phases as a matter of convenience and not limitation. FIGS. 11-15 divide the operations of the various phases into those that occur on a client and those that occur on a backup server, as indicated by the Client column and the Backup Server column shown of the figures.

Figure 11:
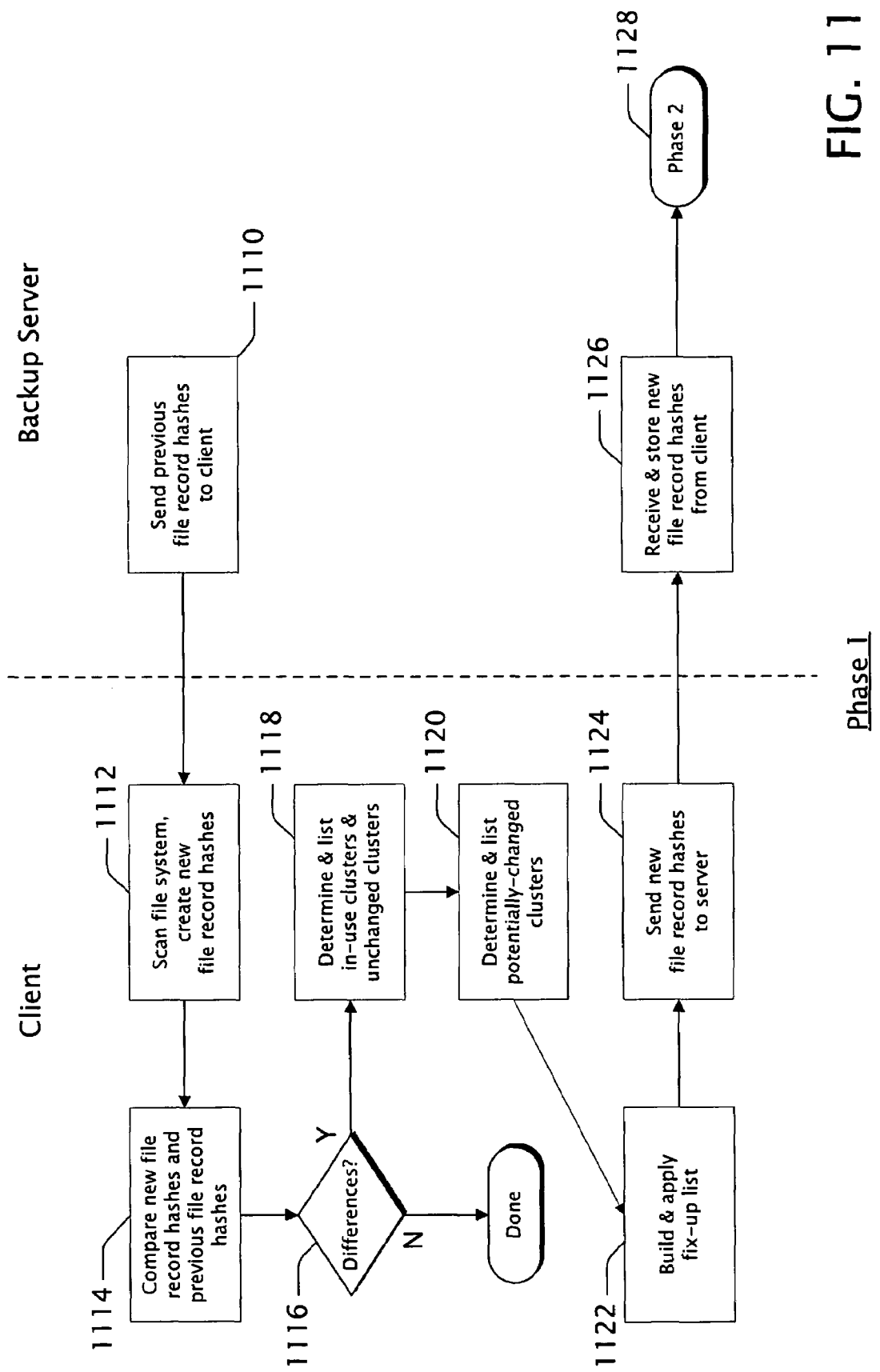
FIG. 11 is a block diagram showing Phase 1 of an example cluster-based backup operation.

FIG. 11 is a block diagram showing Phase 1 of an example cluster-based backup operation. After the client has established a protocol session with the backup server, requested the start of a backup operation, indicated the volumes to backup, and provided volume configuration information, then Phase 1 begins at block 1110 with respect to the first volume to be backed up.

At block 1110, the backup server retrieves from its backup database a set of previous file record hashes from the last backup created of the volume, if any, and sends the set to the client. In one example, the previous file record hashes are sent to the client using FileRecordHash response messages. The set of previous file record hashes represent the state of the volume's files system at the time of the previous backup. If there was no previous backup, then no previous file record hashes are sent to the client. In this case a complete backup is generally performed. Otherwise an incremental backup is generally performed unless nothing has changed on the volume since the previous backup.

At block 1112, the client scans the file system of the volume, reads the file records into a "new file record list", and calculates a set of new file record hashes from the new file record list. The set of new file record hashes represents the current state of the volume's file system. The scanning, reading, and calculating may occur while the backup server is sending the previous set to the client. In one example, a point-in-time copy of the volume is used for the foregoing and subsequent backup operations, such as produced by Volume Shadow Copy Service ("VSS") or the like.

At block 1114, the client compares the sets of new and previous file record hashes to determine if there have been any changes on the volume. If not, as indicated by block 1116, then Phase 1 and the entire backup operation for the unchanged volume is done. If something has changed on the volume, then Phase 1 continues at block 1118.

At block 1118, the client builds a list of the clusters on the volume that are in-use, resulting in a "current in-use clusters list". Clusters that are not currently in-use are typically not included in the backup operation. In addition, clusters containing data from ephemeral files that contain temporary data, cached data, and the like may be marked as not-in-use by removing them from the current in-use clusters list. Specific examples of such files include "pagefile.sys" and "hiberfil.sys" as typically used by various versions of the Microsoft Windows operating system. Any such ephemeral file and the clusters it is comprised of may be marked as not-in-use. Such files may be determined automatically by the backup system, may be specified as part of a backup configuration, and/or may be specified by a user and/or administrator of the backup system.

Also, at block 1118, the client builds a list of clusters that are unchanged since the previous backup, resulting in a "current unchanged clusters list". In one example, if a new file record hash is unchanged compared to the corresponding previous file record hash, then the clusters associated with the new file record hash are assumed to be unchanged.

At block 1120, the client determines which clusters on the volume have potentially changed since the previous backup, building a "potentially changed clusters list". In one example, this is done by determining which clusters are associated with file records that have changed since the previous backup.

At block 1122, the client builds a "fix-up list" that is used to modify the content of clusters, and applies the fix-up list to the potentially changed clusters. The fix-up list indicates which clusters should have their content modified and how the content should be modified; such a list may be empty. In one example, the portion of a cluster after the end of a file stored in the cluster is set to zero, or some other pre-determined value. In another example, a file record may be marked so as to indicate that the file it represents is not-in-use. In another example, a file record may be marked so as to indicate that the folder it represents is empty. Typically, file records in the new file record list are marked rather than the file records on the volume. In yet another example, the contents of a cluster may be partially or completely replaced. Such operations may be performed prior to when file record hashes and/or cluster hashes are calculated. Such fix-up operations are typically performed on clusters in lists, such as the current in-use clusters list, the current unchanged clusters list, the potentially changed clusters list, and the like, rather than on the volume itself.

At block 1124, the client sends the set of new file record hashes to the backup server reflecting the state of the volume at the start of the backup operation. In one example, the new file record hashes are sent to the backup server using FileRecordHash request messages.

At block 1126, the backup server receives and stores the set of new file record hashes from the client, and the backup process transitions to Phase 2 as indicated by block 1128. In one example, the set of new file record hashes is stored in the backup database and becomes the previous set upon successful completion of the backup operation.

Figure 12:
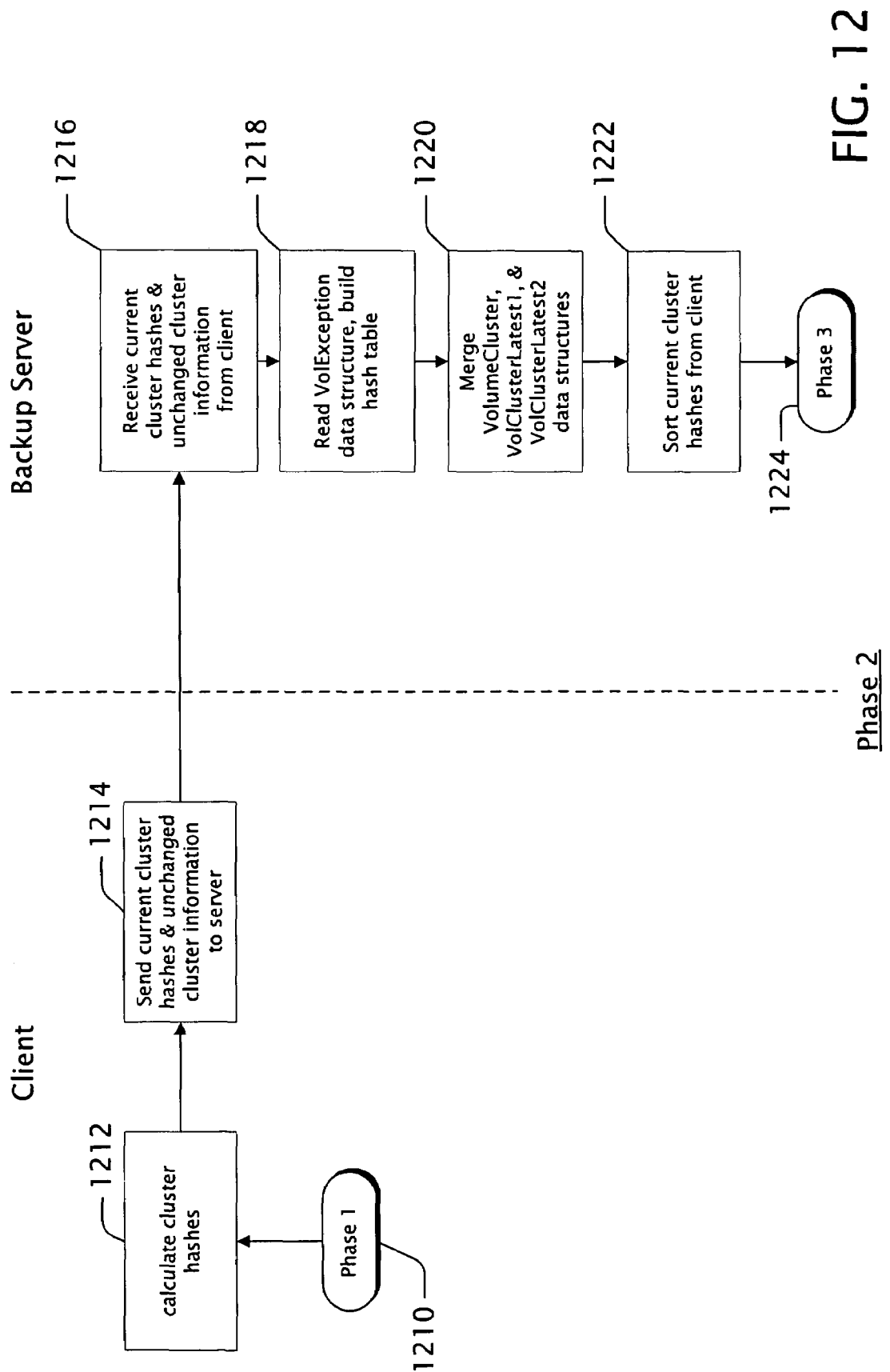
FIG. 12 is a block diagram showing Phase 2 of the example cluster-based backup operation.

FIG. 12 is a block diagram showing Phase 2 of the example cluster-based backup operation. The transition from Phase 1 to Phase 2 is indicated by block 1210 with Phase 2 beginning at block 1212.

At block 1212, after applying the fix-up list, if any, and excluding any clusters marked as not-in-use, the client calculates a cluster hash for each of the remaining potentially changed clusters. The hash calculations result in a "set of current cluster hashes". In one example, a cluster hash is calculated by first applying any appropriate fix-ups to the cluster content and then providing the fixed-up cluster content as an input value to an MD5 hashing function, resulting in a cluster output value. Alternatively, any other appropriate function as described above for calculating hash values may be used.

At block 1214, the client sends the set of current cluster hashes to the backup server. In one example, the current cluster hashes are sent to the backup server using ClusterHash request messages. In another example, the current cluster hashes are sent in increasing order of cluster index. For example, when sending cluster hashes for the first 5 clusters on a volume, the cluster hash for the first cluster is sent first, the cluster hash for the second cluster is sent second, and so on until all 5 cluster hashes have been sent in cluster index order 0-4. The client also sends information from the unchanged cluster list to the backup server. In one example, the unchanged cluster list is scanned to determine contiguous ranges of unchanged clusters and the contiguous ranges are sent to the backup server using ClustersUnchanged request messages.

At block 1216, the backup server receives the set of current cluster hashes and the information from the unchanged cluster list.

At block 1218, the backup server reads records from a VolumeException data structure for the volume being backed up and builds a hash table with the contents of the data structure. The VolumeException data structure is described in more detail in connection with FIG. 32.

At block 1220, the backup server reads and combines records including cluster hashes from a VolumeCluster data structure, a VolumeClusterLatest1 data structure, a VolumeClusterLatest2 data structure, and the set of current cluster hashes indicating potentially changed clusters, and merges the combined set of cluster hashes, except for any current cluster hashes representing clusters that have changed since the previous backup, into a new VolumeCluster data structure. Also resulting from the merge is a "set of changed cluster hashes" representing the cluster that have changed since the previous backup. In one example, the set of changed clusters is created by including hashes from the set of current cluster hashes that are not also in one or more of the VolumeCluster, VolumeClusterLatest1, and VolumeClusterLatest2 data structures, which are described in connection with FIGS. 30 and 31.

At block 1222, the backup server sorts the set of changed cluster hashes resulting in a "set of sorted changed cluster hashes". In one example, the set of changed cluster hashes is first structured as (index, hash) pairs and then sorted in index order, where index is the cluster's index on the volume and hash is the corresponding cluster hash. Any type of sort may be used. In one example, the sort is a virtual-memory and cache-aware sort of the type described in U.S. patent application Ser. No. 11/407,783 filed on even date herewith and herein included by reference in its entirety. At this point the backup process transitions to Phase 3 as indicated by block 1224.

Figure 13:
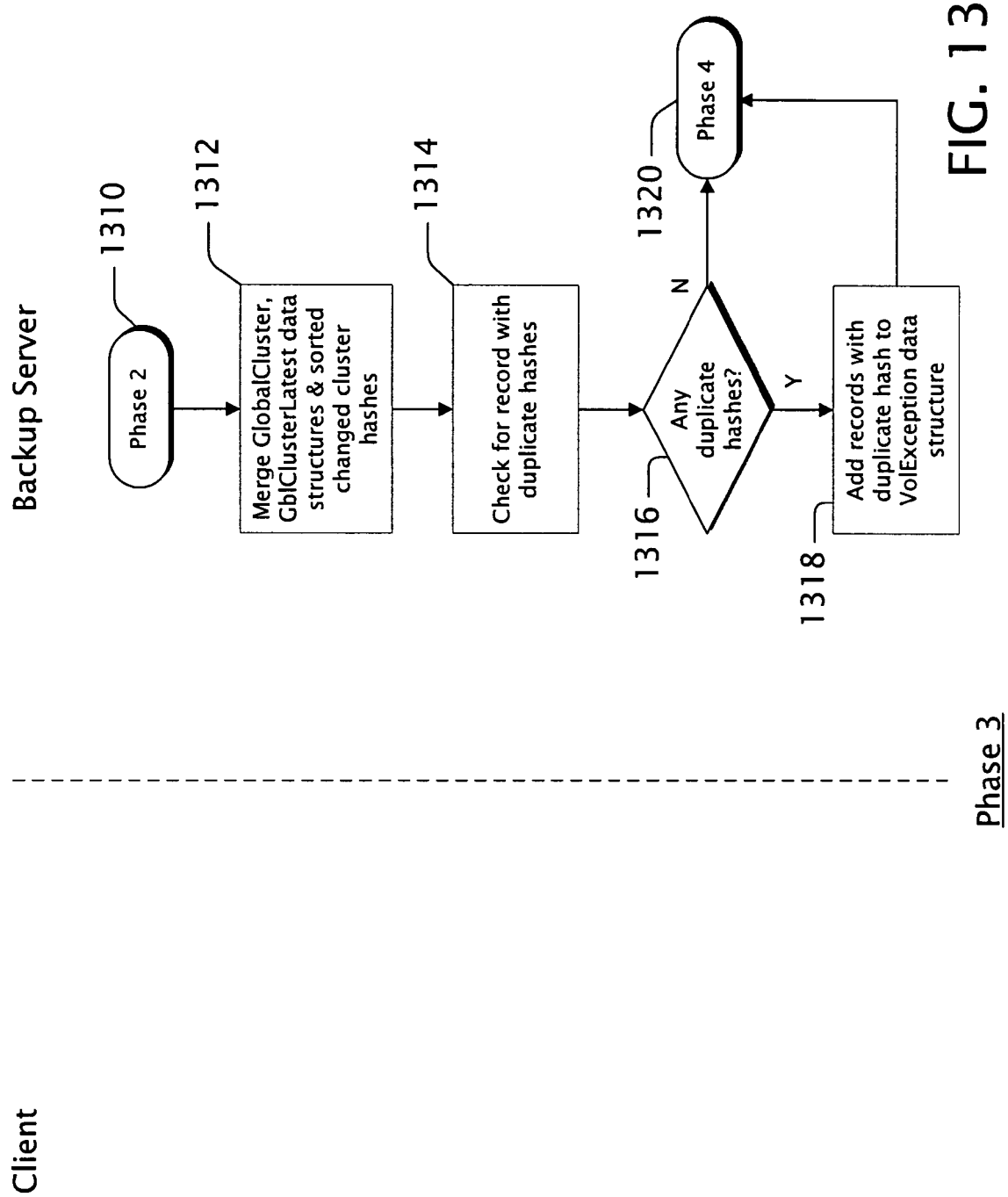
FIG. 13 is a block diagram showing Phase 3 of the example cluster-based backup operation.

FIG. 13 is a block diagram showing Phase 3 of the example cluster-based backup operation. The transition from Phase 2 to Phase 3 is indicated by block 1310 with Phase 3 beginning at block 1312.

At block 1312, the backup server reads and combines records including cluster hashes from a GlobalCluster data structure, a GlobalClusterLatest data structure, and the set of sorted changed cluster hashes, and merges the combined set of cluster hashes into a new GlobalCluster data structure such that the resulting new GlobalCluster data structure that contains only one record for each unique hash from the combined set of cluster hashes that were merged. The GlobalCluster data structure and GlobalClusterLatest data structure are described in more detail in connection with FIGS. 24 and 25.

At block 1314, the backup server determines if there were multiple records with the same cluster hash in the combined set of cluster hashes. If not, then the backup process transitions to Phase 4 as indicated by blocks 1316 and 1320. If there are records with the same cluster hash, then the process continues at block 1318.

At block 1318, when there are records with the same cluster hash, the backup server adds a copy of the duplicated records to the VolumeException data structure, and the process transitions to Phase 4 as indicated by block 1320. The VolumeException data structure is described in more detail in connection with FIG. 32.

Figure 14:
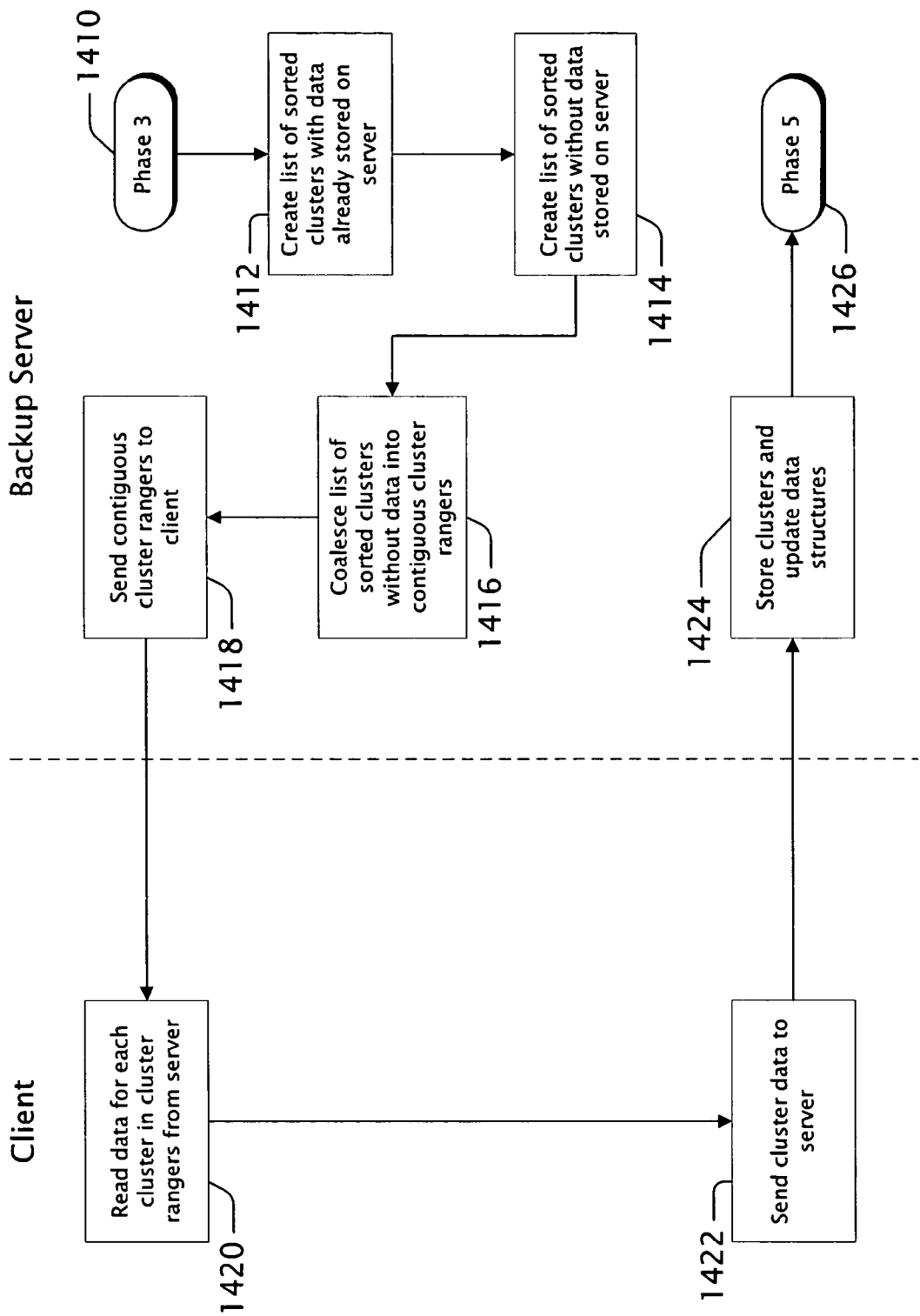
FIG. 14 is a block diagram showing Phase 4 of the example cluster-based backup operation.

FIG. 14 is a block diagram showing Phase 4 of the example cluster-based backup operation. The transition from Phase 3 to Phase 4 is indicated by block 1410 with Phase 4 beginning at block 1412.

At block 1412, the backup server scans the set of sorted changed cluster hashes and determines which of the cluster hashes from the set represent cluster contents already stored by the backup server. Cluster hashes from the set that are already stored by the backup server are added to a VolumeClusterLatest1 data structure. The VolumeClusterLatest1 data structure is described in more detail in connection with FIG. 31.

At block 1414, the backup server scans the set of sorted changed cluster hashes and determines which of the cluster hashes from the set represent cluster contents that are not already stored by the backup server and creates a set of needed cluster hashes.

At block 1424, the backup server coalesces the set of needed cluster hashes into a list of contiguous ranges of needed clusters.

At block 1418, the backup server sends each contiguous range of needed clusters to the client. In one example, this is done by sending a NeedClusterData response message to the client for each continuous range of clusters needed.

At block 1420, the client receives each contiguous range of needed clusters from the backup server and reads the content of the needed clusters from the volume being backed up.

At block 1422, the client sends the needed cluster contents to the backup server. In one example, this is done by sending a ClusterData request message to the backup server for each continuous range of clusters needed.

At block 1424, the backup server adds each of the cluster contents received from the client to a GlobalData data structure, calculates a cluster hash for each of the received cluster contents, adds records including the cluster hash representing each cluster contents to a VolumeClusterLatest2 data structure, sorts the records including the calculated cluster hashes, and the process transitions to Phase 5 as indicated by block 1426. The VolumeClusterLatest2 data structure is described in more detail in connection with FIG. 31.

Figure 15:
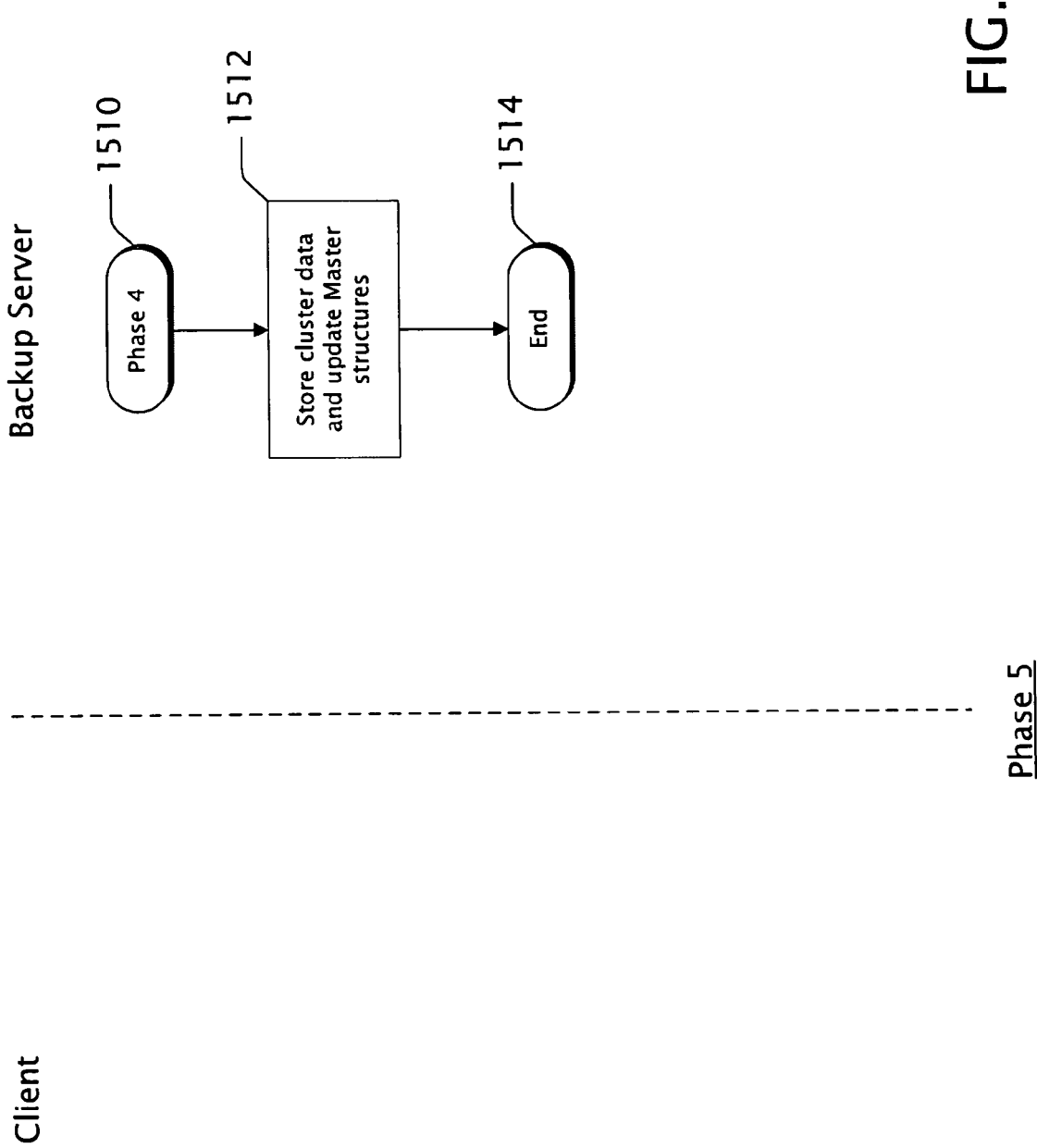
FIG. 15 is a block diagram showing Phase 5 of the example cluster-based backup operation.

FIG. 15 is a block diagram showing Phase 5 of the example cluster-based backup operation. The transition from Phase 4 to Phase 5 is indicated by block 1510 with Phase 5 beginning at block 1512.

At block 1512, the backup server stores the sorted records in a GlobalClusterLatest data structure, commits the backup of the volume, and the backup process is complete. The GlobalClusterLatest data structure is described in more detail in connection with FIG. 25.

Figure 16:
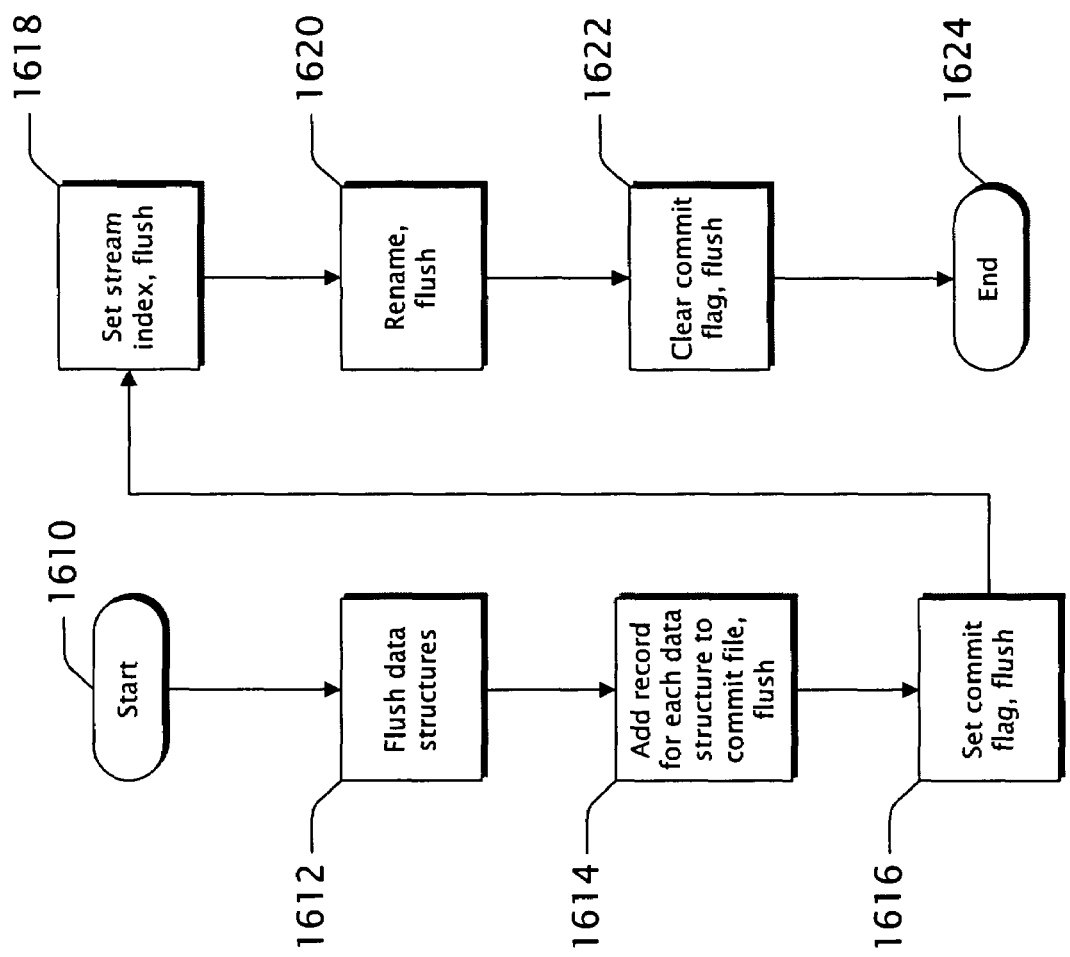
FIG. 16 is a block diagram showing an example commit operation for a backup operation.

FIG. 16 is a block diagram showing an example commit operation for a backup operation. Once a backup operation is complete, as indicated by block 1610, the data structures for the backup may be stored in the backup server database using a commit operation. Should a failure occur during the store, the commit operation can provide the ability to recover from the failure. In one example, the commit operation makes use of a Commit data structure, such as described in connection with FIG. 19, including records for the various backup data structures being stored and a commit flag.

At block 1612, the backup server flushes the backup data structures to the backup database.

At block 1614, the backup server adds a record to the Commit data structure for each backup data structure being stored. The backup server then flushes the Commit data structure to the backup database.

At block 1616, the backup server sets the commit flag in the Commit data structure, and then flushes the Commit data structure to the backup database.

At block 1618, the backup server sets a new stream index as appropriate for each of the backup data structures that make use of a stream index. The backup server then flushes the Commit data structure to the backup database.

At block 1620, the backup server renames the backup data structures as appropriate, and then flushes the Commit data structure to the backup database. In one example, any backup data structures maintained as files with a ".new" file name extension are renamed with a ".dat" extension after any existing ".dat" files of the same name are deleted.

At block 1622, the backup server clears the commit flag in the Commit data structure, and then flushes the Commit data structure to the backup database.

At block 1624, the commit operation is complete and the backup data structures have been stored.

In one example, whenever the backup server starts, it reads the Commit data structure from the backup database. If a failure occurred during a previous commit operation, such as the backup server losing power or the like, and at startup time finds the commit flag set, then the backup server assumes there was a failure during the previous commit operation. In this case, the backup server repeats the work done indicated by blocks 1618 through 1624 to salvage the previously failed commit operation.

Figure 17:
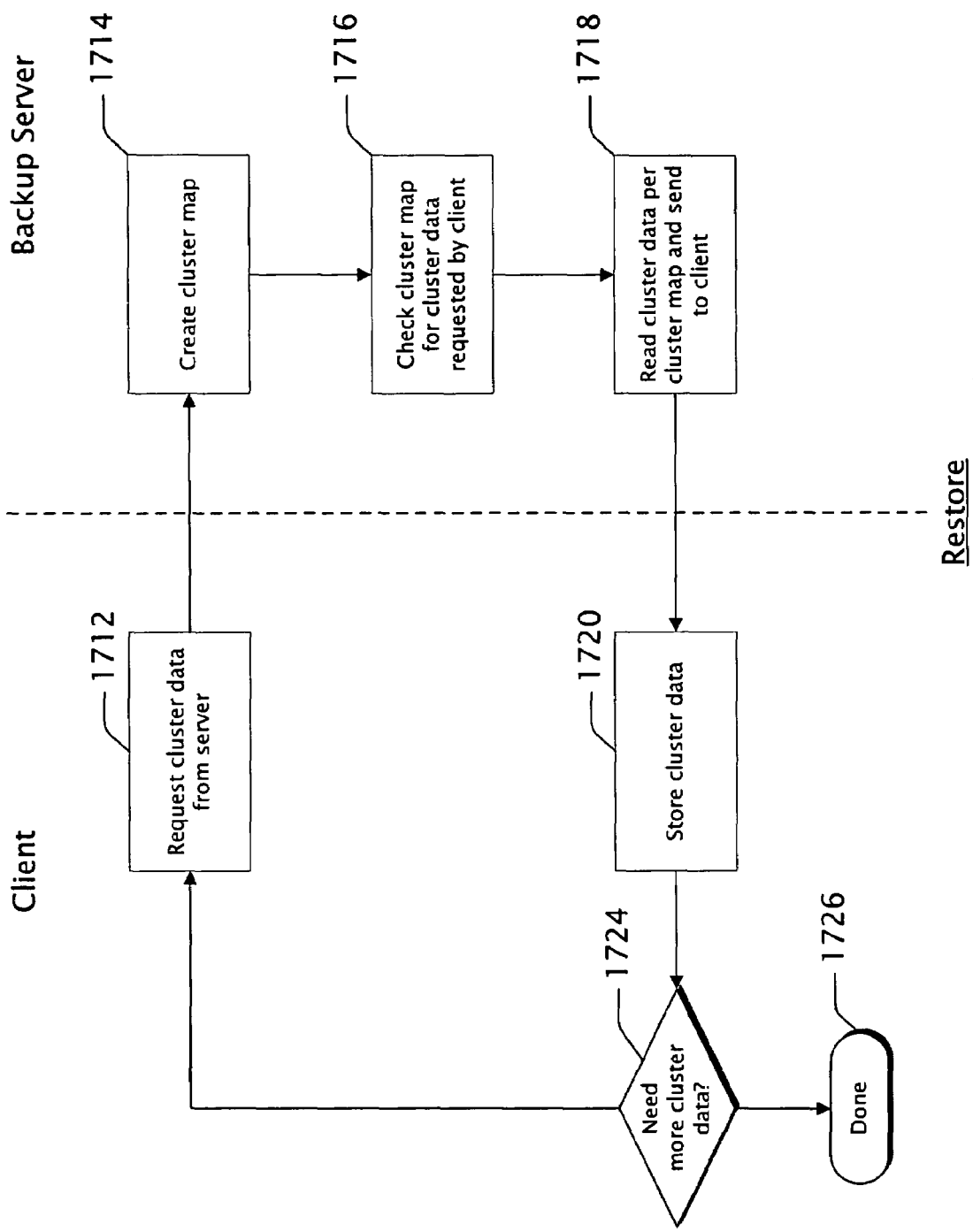
FIG. 17 is a block diagram showing an example cluster-based restore operation for restoring a partial or complete backup from a backup server to a client.

FIG. 17 is a block diagram showing an example cluster-based restore operation for restoring a partial or complete backup from a backup server to a client. The restore operation may be started by a user or automatically. Once the client has established a protocol session with the backup server and requests a restore, the client begins the restore operation as indicated by block 1712. In one example, the client requests a restore using a BeginRestore request message.

At block 1712, the client requests the desired backup data to be restored. In one example, the client sends one or more GetClusters request messages, each specifying a specific contiguous range of cluster contents to be restored.

At block 1714, the backup server determines the specific volume backup containing the clusters requested for restore by the client and begins creating a map of backed-up volume clusters. In one example, each entry in the cluster map includes a cluster's volume index and a pointer to the backed-up contents for the cluster in the backup database. In another example, the map includes a count of contiguous cluster contents starting at the pointer, with one entry in the map for each set of contiguous clusters on the backup server. The map may be created by merging data from VolumeCluster, VolumeClusterLatest, and VolumeException data structures.

At block 1716, the backup server checks the map for specific cluster contents requested by the client. In one example, the backup server may not yet find the requested clusters listed in the map and may delay the check while continuing to build the cluster map.

At block 1718, once the requested clusters are listed in the map, the backup server reads the specific cluster contents from the backup database and sends the contents to the client. In one example, this is done using a ClusterData response message. Should the requested cluster data be missing from the backup, the backup server may send a ClusterDataMissing response message to the client. Should the backup server be unable to read requested cluster data from the backup database, the backup server may send a ClusterDataBad response message to the client.

At block 1720, the client receives cluster contents from the backup server and restores the contents to the volume being restored.

At block 1724, if more cluster contents are required to complete the restore, the process continues at block 1712 where the client may request additional cluster content and/or wait for cluster contents to be received from the backup server in response to requests already sent. If all requested cluster contents have been restored, then the process is complete as indicated by block 1726.

Figure 18:
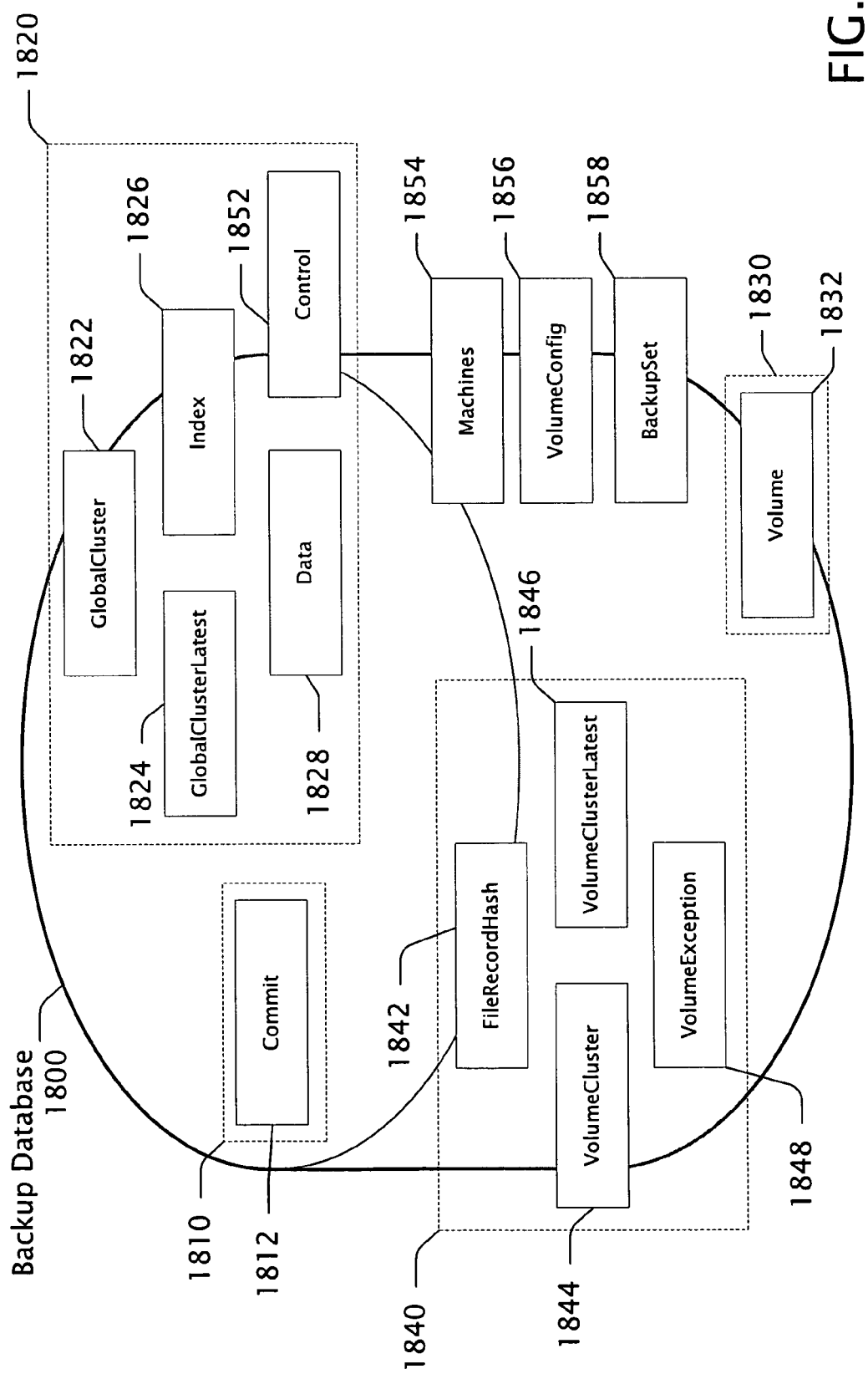
FIG. 18 is a block diagram showing an example backup database including example data structures of which it is comprised.

FIG. 18 is a block diagram showing an example backup database 1800 including example data structures of which it is comprised. Example Control data structure 1852 maintains information about the client machine and volume most recently backed up. Example Machines data structure 1854 identifies the various client machines for which backups are maintained in backup database 1800. Example VolumeConfig data structure 1856 identifies the various volumes for which backups are maintained in backup database 1800. Example BackupSet data structure 1858 identifies the various backup sets maintained in backup database 1800. The remaining example data structures may be organized into one of several sets:

Per backup database data structures: in one example, there is a single instance of this set of data structures 1810 per backup database 1800. In one example, per backup database set 1810 is comprised of a Commit data structure.

Per cluster-size data structures: in one example, there is one instance of this set of data structures 1820 for each different cluster size that is backed up in the backup database 1800. For example, a volume backed up from one client may have a 2048 byte cluster size. Volumes backed up from a second client may have cluster sizes of 4096 bytes and 2048 bytes. In this case, there is one set of per cluster-size data structures 1820 for each of the two cluster sizes of 2048 bytes and 4096 bytes. In one example, each per cluster-size set 1820 is comprised of a GlobalCluster data structure 1822, a GlobalClusterLatest data structure 1824, an Index data structure 1826, and a Data data structure 1828.

Per volume data structures: in one example, there is one instance of this set of data structures 1830 for each client volume that is backed up in backup database 1800. For example, if client machine "Client1" includes volumes "Vol1" and "Vol2" that are both backed up, then backup database 1800 includes one per volume set 1830 for Vol1 and another per volume set 1830 for Vol2. In one example, per volume set 1830 include a Volume data structure.

Per volume-cluster-size data structures: in one example, there is one instance of this set of data structures 1840 for each different cluster size of each volume that is backed up in the backup database 1800. For example, if Vol1 having as cluster size of 2048 bytes was backed up, then backup database 1800 includes one per volume-cluster-size set 1840 for Vol1 with a 2048 byte cluster size. If Vol1 is subsequently modified to have a 4096 byte cluster size (such as via replacement, reformatting, or the like) and is again backed up, then backup database 1800 further includes a per volume-cluster-size set 1840 for Vol1 with a 4096 byte cluster size. In one example, per volume-cluster-size set 1840 includes a FileRecordHash data structure 1842, a VolumeCluster data structure 1844, a VolumeClusterLatest data structure 1846, and a VolumeException data structure 1848.

In one example, each of the foregoing example data structures is implemented as a file with each file including: a fixed header providing information about the file including a "file type", the number of data streams included in the file, the size of the data stream chunks if multiple data streams, a data stream sequence number, and a current data stream indicator or index; a file-specific header including a description of the specific set the data structure file is a part of; an extensible markup language ("XML") description of the schema of the file; and one or more streams of data.

FIG. 19 is an XML description showing the schema of an example Commit data structure 1812. In one example, Commit data structure 1812 is implemented as a file and is used to commit backup data at the end of a backup operation.

Header section 1910 includes a Committed field 1911 that is set and reset as part of the commit operation described in connection with FIG. 16. Record section 1920 includes a FileName field 1921 indicating the file name of a data structure file being created, updated, or deleted as part of a backup operation and a StreamIndex field 1922 indicating the index of the data structure file's current data stream. The Commit data structure 1812 file is named using the format: "Commit.dat".

Alternatively, in another example, Commit data structure 1812 may be titled differently, may include equivalent fields named and/or structured differently, may be combined with other data structures, or may be implemented in various other forms.

FIG. 20 is an XML description showing the schema of an example Control data structure 1852. In one example, Control data structure 1852 is implemented as a file and is used to maintain information about the client machine and volume most recently backed up. Once such file is maintained for each different volume cluster size.

Header section 2010 includes a BytesPerCluster field 2011 indicating the cluster size of the volume, a NextIndex field 2012 indicating the next available index in the Index data structure 1826, and a NextDataOffset field 2013 indicating the offset of the next available cluster content data location in the Data data structure 1828.

Control data structure 1852 files are named using the format: "Control.<size>.dat" where size is the volume cluster size in bytes. For example, for a volume with a cluster size of 4096 bytes, the associated Control data structure 1852 file would be named: "Control.4096.dat".

Alternatively, in another example, Control data structure 1852 may be titled differently, may include equivalent fields named and/or structured differently, may be combined with other data structures, or may be implemented in various other forms.

FIG. 21 is an XML description showing the schema of an example Machines data structure 1854. In one example, Machines data structure 1854 is implemented as a file and is used to maintain information about the client machines for which backups are maintained in the backup database.

One record section 2110 is included in the Machines data structure 1854 file for each client machine known to the backup database. Each machine record 2110 includes: a MachineGuid field 2111 uniquely identifying the client machine; a ScheduleDays field 2112 and a ScheduleMinutes field 2113 identifying the machine's backup schedule in days of the week and time in minutes after midnight, local time; and a MacAddress field 2114 identifying the machine's unique Media Access Control ("MAC") address. The Machines data structure 1854 file is named using the format: "Machines.dat".

Alternatively, in another example, Machines data structure 1854 may be titled differently, may include equivalent fields named and/or structured differently, may be combined with other data structures, or may be implemented in various other forms.

FIG. 22 is an XML description showing the schema of an example VolumeConfig data structure 1856. In one example, VolumeConfig data structure 1856 is implemented as a file and is used to maintain information about client machine volumes backed up in the backup database. The backup server maintains one such file for each client machine for which volume configurations are defined.

Header section 2210 includes a MachineGuid field 2211 to uniquely identify the client machine associated with the VolumeConfig data structure 1856 file's volume configuration information. Each record section 2220 includes information defining and uniquely identifying a volume associated with the client machine uniquely identified by MachineGuid 2211. One such record section 2220 exists for each defined volume.

VolumeConfig data structure 1856 files are named using the format: "<machine>.VolumeConfig.dat" where machine is the name of the client machine for which the volume data is defined. For example, for a machine named "Client1", the associated VolumeConfig data structure 1856 file would be named: "Client1.VolumeConfig.dat".

Alternatively, in another example, VolumeConfig data structure 1856 may be titled differently, may include equivalent fields named and/or structured differently, may be combined with other data structures, or may be implemented in various other forms.

FIG. 23 is an XML description showing the schema of an example BackupSet data structure 1858. In one example, BackupSet data structure 1858 is implemented as a file and is used to maintain a list of all backup sets stored in the backup database for a specific client machine.

Header section 2310 includes a MachineGuid field 2311 to uniquely identify the client machine associated with the backup sets. Each record section 2320 includes information defining and uniquely identifying a backup set associated with the client machine uniquely identified by MachineGuid 2311. One such record section 2320 exists for each backup set associated with the client machine stored in the backup database.

BackupSet data structure 1858 files are named using the format: "<machine>.BackupSet.dat" where machine is the name of the client machine for which the backup set is defined. For example, for a machine named "Client1", the associated BackupSet data structure 1858 file would be named: "Client1.Backup.dat".

Alternatively, in another example, BackupSet data structure 1858 may be titled differently, may include equivalent fields named and/or structured differently, may be combined with other data structures, or may be implemented in various other forms.

FIG. 24 is an XML description showing the schema of an example GlobalCluster data structure 1822. In one example, GlobalCluster data structure 1822 is implemented as a file and is used to store one record for each unique cluster in the backup database, excluding the clusters that were added by the most recent backup. There is one such file for each different cluster size stored in the backup database.

Header section 2410 includes a BytesPercluster field 2411 to identify the cluster size associated with the GlobalCluster data structure 1822 file. Each record section 2420 includes information uniquely identifying a cluster stored in the backup database including a Hash field 2421 that is an MD5 hash of the cluster contents and a DataIndex field 2422 that references the associated cluster contents in the Data data structure 1828 of the backup database. One such record section 2420 exists for each cluster stored in the backup database.

GlobalCluster data structure 1822 files are named using the format: "GlobalCluster.<size>.dat" where size is the cluster size in bytes of the cluster associated with the file. For example, for a cluster size of 4096 bytes, the associated GlobalCluster data structure 1822 file would be named: "GlobalCluster.4096.dat".

Alternatively, in another example, GlobalCluster data structure 1822 may be titled differently, may include equivalent fields named and/or structured differently, may be combined with other data structures, or may be implemented in various other forms.

FIG. 25 is an XML description showing the schema of an example GlobalClusterLatest data structure 1824. In one example, GlobalClusterLatest data structure 1824 is implemented as a file and is used to store one record for each unique cluster in the backup database that was added by the most recent backup. There is one such file for each different cluster size stored in the backup database.

Header section 2510 includes a BytesPerCluster field 2511 to identify the cluster size associated with the GlobalClusterLatest data structure 1824 file. Each record section 2520 includes information uniquely identifying a cluster stored in the backup database including a Hash field 2521 that is an MD5 hash of the cluster contents and a DataIndex field 2522 that references the associated cluster contents in the Data data structure 1828 of the backup database. One such record section 2520 exists for each cluster stored in the backup database.

GlobalClusterLatest data structure 1824 files are named using the format: "GlobalClusterLatest.<size>.dat" where size is the cluster size in bytes of the cluster associated with the file. For example, for a cluster size of 4096 bytes, the associated GlobalClusterLatest data structure 1824 file would be named: "GlobalClusterLatest.4096.dat".

Alternatively, in another example, GlobalClusterLatest data structure 1824 may be titled differently, may include equivalent fields named and/or structured differently, may be combined with other data structures, or may be implemented in various other forms.

FIG. 26 is an XML description showing the schema of an example Index data structure 1826. In one example, Index data structure 1826 is implemented as a file and is used to store one record for each unique cluster or a particular size stored in the backup database, plus one record at the end indicating the next available record location. There is one such file for each different cluster size stored in the backup database.

Header section 2610 includes a BytesPerCluster field 2611 identifying the cluster size associated with the Index data structure 1826 file. Record section 2620 includes a ByteOffset field 2621 representing a cluster and indicating the offset of the cluster contents in the Data data structure 1828. One such record section 2620 exists for each cluster stored in the backup database. Record sections 2620 are typically added to the Index data structure 1826 file in the same order cluster data is added to the Data data structure 1828 of the backup database. The length of a cluster is implied by the offset of the following cluster. Once a record 2620 is added it is typically not changed, except when recovering space from deleted backups.

Index data structure 1824 files are named using the format: "Index.<size>.dat" where size is the cluster size in bytes of the cluster associated with the file. For example, for a cluster size of 4096 bytes, the associated Index data structure 1824 file would be named: "Index.4096.dat".

Alternatively, in another example, Index data structure 1824 may be titled differently, may include equivalent fields named and/or structured differently, may be combined with other data structures, or may be implemented in various other forms.

FIG. 27 is an XML description showing the schema of an example Data data structure 1828. In one example, Data data structure 1828 is implemented as a file and is used to store one record for each unique cluster of a particular size stored in the backup database. There is one such file for each different cluster size stored in the backup database.

Header section 2710 includes a BytesPerCluster field 2711 identifying the cluster size associated with the Data data structure 1828 file. Record section 2720 includes a ClusterData field 2721 containing the content of a cluster. One such record section 2720 exists for each cluster stored in the backup database. The length of a cluster is implied by the offset of the cluster compared to the offset of the next cluster as indicated in the Index data structure 1826 file. Record sections 2720 are typically added to the Data data structure 1828 file in the order received from the client. Once a record 2720 is added it is typically not changed, except when recovering space from deleted backups.

Data data structure 1828 files are named using the format: "Data.<size>.dat" where size is the cluster size in bytes of the cluster associated with the file. For example, for a cluster size of 4096 bytes, the associated Data data structure 1828 file would be named: "Data.4096.dat".

Alternatively, in another example, Data data structure 1828 may be titled differently, may include equivalent fields named and/or structured differently, may be combined with other data structures, or may be implemented in various other forms.

FIG. 28 is an XML description showing the schema of an example Volume data structure 1832. In one example, Volume data structure 1832 is implemented as a file and is used to store each backup version of the volume. There is one such file for each different volume backed up in the backup database.

Header section 2810 includes a MachineGuid field indicating the client machine and a UniqueId field indicating the backed up volume associated with the machine. Record section 2820 includes a BackupSetIndex field indicating the backup set of which the backup version identified by record 1829 is a part. Record section 2820 also includes a version field indicating the specific version of the backup identified by record 1829. One such record section 2820 exists for each backup version of the volume that is stored in the backup database with the records typically stored in increasing order of version number.

Volume data structure 1858 files are named using the format: "<machine>.<volume>.Volume.dat" where machine is the name of the client machine and volume is the backed up volume. For example, for a machine named "Client1" with a volume named "Vol1", the associated Volume data structure 1858 file would be named: "Client1.Vol1.Volume.dat".

Alternatively, in another example, Volume data structure 1858 may be titled differently, may include equivalent fields named and/or structured differently, may be combined with other data structures, or may be implemented in various other forms.

FIG. 29 is an XML description showing the schema of an example FileRecordHash data structure 1842. In one example, FileRecordHash data structure 1842 is implemented as a file and is used to store file record hashes of the most recent volume backup. There is one such file for each different volume and volume cluster size backed up in the backup database.

Header section 2910 includes a MachineGuid field 2911 indicating the client machine, a UniqueId field 2912 indicating the volume associated with the machine, and a BytesPerCluster field 2913 indicating the cluster size of the volume. Record section 2920 includes an Index field 2921 indicating the index number of a file record in the volume's file system and a Hash field 2922 storing a hash of the file record associated with the index number.

FileRecordHash data structure 1842 files are named using the format: "<machine>.<volume>.FileRecordHash.<size>.dat" where machine is the name of the client machine, and volume is the volume associated with the machine, and size is the cluster size of the volume. For example, for a machine named "Client1" with a volume named "Vol1" with a 2048 cluster size, the associated FileRecordHash data structure 1842 file would be named: "Client1.Vol1.FileRecordHash.2048.dat".

Alternatively, in another example, FileRecordHash data structure 1842 may be titled differently, may include equivalent fields named and/or structured differently, may be combined with other data structures, or may be implemented in various other forms.

FIG. 30 is an XML description showing the schema of an example VolumeCluster data structure 1844. In one example, VolumeCluster data structure 1844 is implemented as a file and is used to store one record for each version of each cluster of a volume that has been backed up, excluding the most recent backup. There is one such file for each different volume and volume cluster size backed up in the backup database.

Header section 3010 includes a MachineGuid field 3011 indicating the client machine, a UniqueId field 3012 indicating the volume associated with the machine, and a BytesPercluster field 3013 indicating the cluster size of the volume. Record section 3020 includes: a ClusterIndex field 3021 indicating the cluster index associated with a record 3020; a LowestVersion field 3022 indicating the lowest backup version number to which the record 3020 applies; a HighestVersion field 3023 indicating the highest backup version number to which the record 3020 applies; a Hash field 3024 storing a hash of the cluster associated with the cluster index; and a DataIndex field 3025 pointing to the cluster stored in the Data data structure 1828. There is one such record 3020 for each version of each cluster on a backed up volume, excluding clusters in the latest backup that changed from the previous backup.

VolumeCluster data structure 1842 files are named using the format: "<machine>.<volume>.VolumeCluster.<size>.dat" where machine is the name of the client machine, and volume is the volume associated with the machine, and size is the cluster size of the volume. For example, for a machine named "Client1" with a volume named "Vol1" with a 2048 cluster size, the associated VolumeCluster data structure 1842 file would be named: "Client1.Vol1.VolumeCluster.2048.dat".

Alternatively, in another example, VolumeCluster data structure 1842 may be titled differently, may include equivalent fields named and/or structured differently, may be combined with other data structures, or may be implemented in various other forms.

FIG. 31 is an XML description showing the schema of an example VolumeClusterLatest data structure 1858. In one example, VolumeClusterLatest data structure 1858 is implemented as two files that are used to store one record for each cluster of the current volume backup, excluding clusters unchanged from the previous backup. The first of the two files (indicated by a "1" in the file name) includes records for those clusters of the volume that were already present in the backup database, typically from a different client. The second of the two files (indicated by a "2" in the file name) includes records for those clusters of the volume for which the cluster content was not already present in the backup database.

Header section 3110 includes a MachineGuid field 3111 indicating the client machine, a UniqueId field 3112 indicating the volume associated with the machine, a BytesPerCluster field 3113 indicating the cluster size of the volume, and a BackupSetIndex field 3114 indicating the backup set of which the VolumeClusterLatest data structure 1858 file is a part. Record section 3020 includes: a ClusterIndex field 3121 indicating the cluster index associated with a record 3020; a Hash field 3122 storing a hash of the cluster associated with the cluster index; and a DataIndex field 3123 pointing to the cluster stored in the Data data structure 1828. There is one such record 3120 for each cluster in the latest backed up the volume.

VolumeClusterLatest data structure 1842 files are named using the format: "<machine>.<volume>.VolumeCluster<n>.<size>.dat" where machine is the name of the client machine, and volume is the volume associated with the machine, and size is the cluster size of the volume, and n is either "1" or "2". For example, for a machine named "Client1" with a volume named "Vol1" with a 2048 cluster size, the associated pair of VolumeClusterLatest data structure 1842 files would be named: "Client1.Vol1.VolumeCluster1.2048.dat" and "Client1.Vol1.VolumeCluster2.2048.dat".

Alternatively, in another example, VolumeClusterLatest data structure 1842 may be titled differently, may include equivalent fields named and/or structured differently, may be combined with other data structures, or may be implemented in various other forms.

FIG. 32 is an XML description showing the schema of an example VolumeException data structure 1848. In one example, VolumeException data structure 1848 is implemented as a file and is used to store clusters received from the client but later determined to already exist in the backup database. There is one such file for each different volume and volume cluster size backed up in the backup database.

Header section 3210 includes a MachineGuid field 3211 indicating the client machine, a UniqueId field 3212 indicating the volume associated with the machine, a BytesPerCluster field 3213 indicating the cluster size of the volume, and a BackupSetIndex field 3214 indicating the backup set of which the VolumeException data structure 1848 file is a part. Record section 3120 includes an OldClusterIndex field 3221 indicating the location of the original cluster in Data data structure 1828 and a NewClusterIndex field 3222 indicating the location of the duplicate cluster in Data data structure 1828.

VolumeException data structure 1848 files are named using the format: "<machine>.<volume>.VolumeException.<size>.dat" where machine is the name of the client machine, and volume is the volume associated with the machine, and size is the cluster size of the volume. For example, for a machine named "Client1" with a volume named "Vol1" with a 2048 cluster size, the associated VolumeException data structure 1848 file would be named: "Client1.Vol1.VolumeException.2048.dat".

Alternatively, in another example, VolumeException data structure 1848 may be titled differently, may include equivalent fields named and/or structured differently, may be combined with other data structures, or may be implemented in various other forms.

Figure 33:
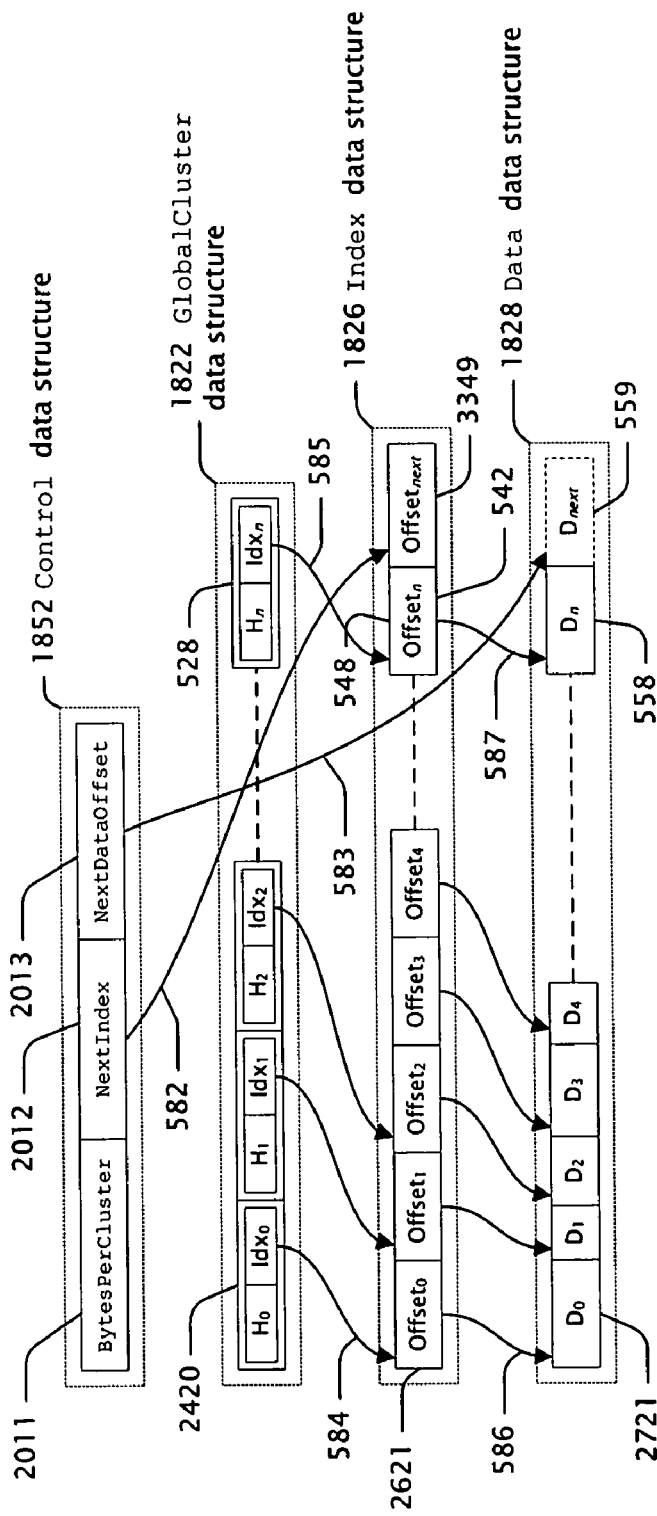
FIG. 33 is a block diagram showing example relationships between a portion of the per cluster-size data structures.

FIG. 33 is a block diagram showing example relationships between a portion of the per cluster-size 1820 data structures. These relationships provide for the organization and efficient storage and access of backup data. One such set of data structures 1820 exists for each cluster size stored in the backup database.

Control data structure 1852 includes: NextIndex field 2012 that indicates, as illustrated by pointer 3382, the next available record location $Offset_{next}$ 3349 in Index data structure 1826; and NextDataOffset field 2013 that indicates, as illustrated by pointer 3383, the next available record location $D_{next}$ 3359 in Data data structure 1828.

GlobalCluster data structure 1822 is comprised of records, each record including a cluster hash Hash field 2421 associated with a DataIndex field 2422 pointing to a cluster offset stored in Index data structure 1826 that in turn points to cluster data stored in Data data structure 1828 that is uniquely identified by cluster hash 2421. For example, GlobaCluster entry ($H_0$, $Idx_0$) points 3384 to Index entry ($Offset_0$) which in turn points 3386 to Data entry ($D_0$).

GlobalCluster data structure 1822 stores one record for each unique cluster in the backup database, excluding the clusters that were added by the most recent backup. For example, before the beginning of the $17^{th}$ backup, GlobalCluster data structure 1822 contains records for data added by backups version 1 through 15, but not for backup version 16. Thus, GlobaCluster entry ($H_n$, $Idx_n$) represents the $n^{th}$ record of backup version 15 and points 3385 to Index entry ($Offset_n$), the last index record of backup version 15, which in turn points 3387 to Data entry ($D_n$), the last data record of backup version 15.

Records in GlobalCluster data structure 1822 are typically ordered by the value of their Hash fields 2421. Typically, each backup operation reads the entire GlobalCluster data structure 1822 sequentially and writes a new version of the structure.

Records are appended to in Index data structure 1826 in the order cluster data is received from a client. Once data is added to structure 1826 it is generally not changed, except when recovering space from deleted backups. Records are also appended to in Data data structure 1828 in the order cluster data is received from the client. Cluster data may be stored in a compressed or uncompressed format. Once data is added to structure 1828 it is generally not changed, except when recovering space from deleted backups.

Figure 34:
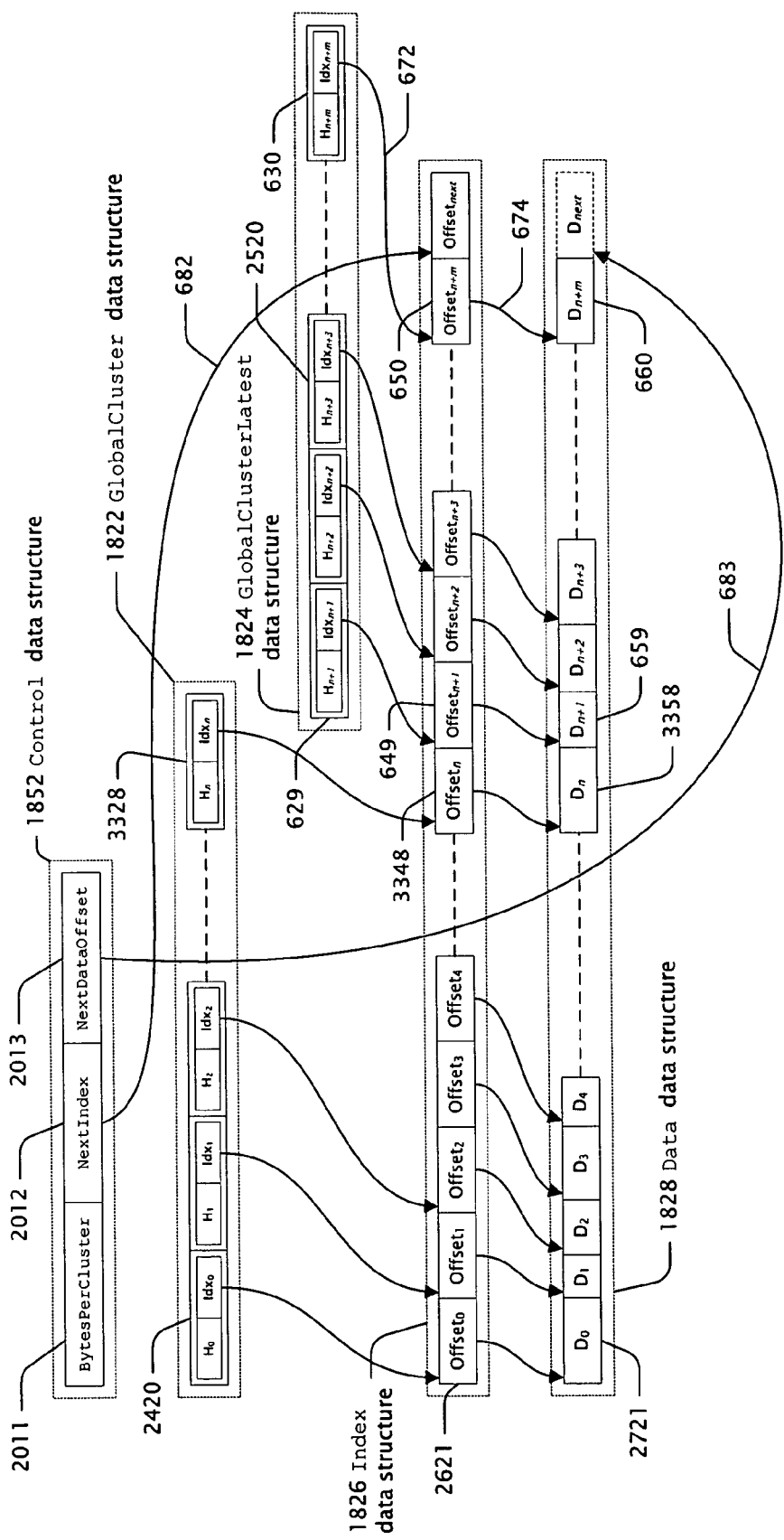
FIG. 34 is a block diagram showing example relationships between the per cluster-size data structures as shown in FIG. 33 with the addition of a GlobalClusterLatest data structure.

FIG. 34 is a block diagram showing example relationships between the per cluster-size 1820 data structures as shown in FIG. 33 with the addition of a GlobalClusterLatest data structure 1824. GlobalClusterLatest data structure 1824 is comprised of records, each record 2520 including a cluster hash Hash field 2521 associated with a DataIndex field 2522 pointing to a cluster offset stored in Index data structure 1826 that in turn points to cluster data stored in Data data structure 1828 that is uniquely identified by cluster hash 2521. For example, GlobaClusterLatest entry ($H_{n+1}$, $Idx_{n+1}$) 3429 points to Index entry ($Offset_{n+1}$) 3349 which in turn points 3386 to Data entry ($D_{n+1}$) 3459.

GlobalClusterLatest data structure 1824 stores one record for each unique cluster in the backup database that was added by the most recent backup. For example, before the beginning of the $17^{th}$ backup, GlobalClusterLatest data structure 1824 contains records for data added by backup version 16, but not for backup versions 1-16. Thus, GlobaClusterLatest entry ($H_{n+m}$, $Idx_{n+m}$) 3430 represents the $m^{th}$ record of backup version 16 and points 3472 to Index entry ($Offset_{n+m}$) 3450, the last index record of backup version 16, which in turn points 3474 to Data entry ($D_{n+m}$) 3460, the last data record of backup version 16.

Figure 35:
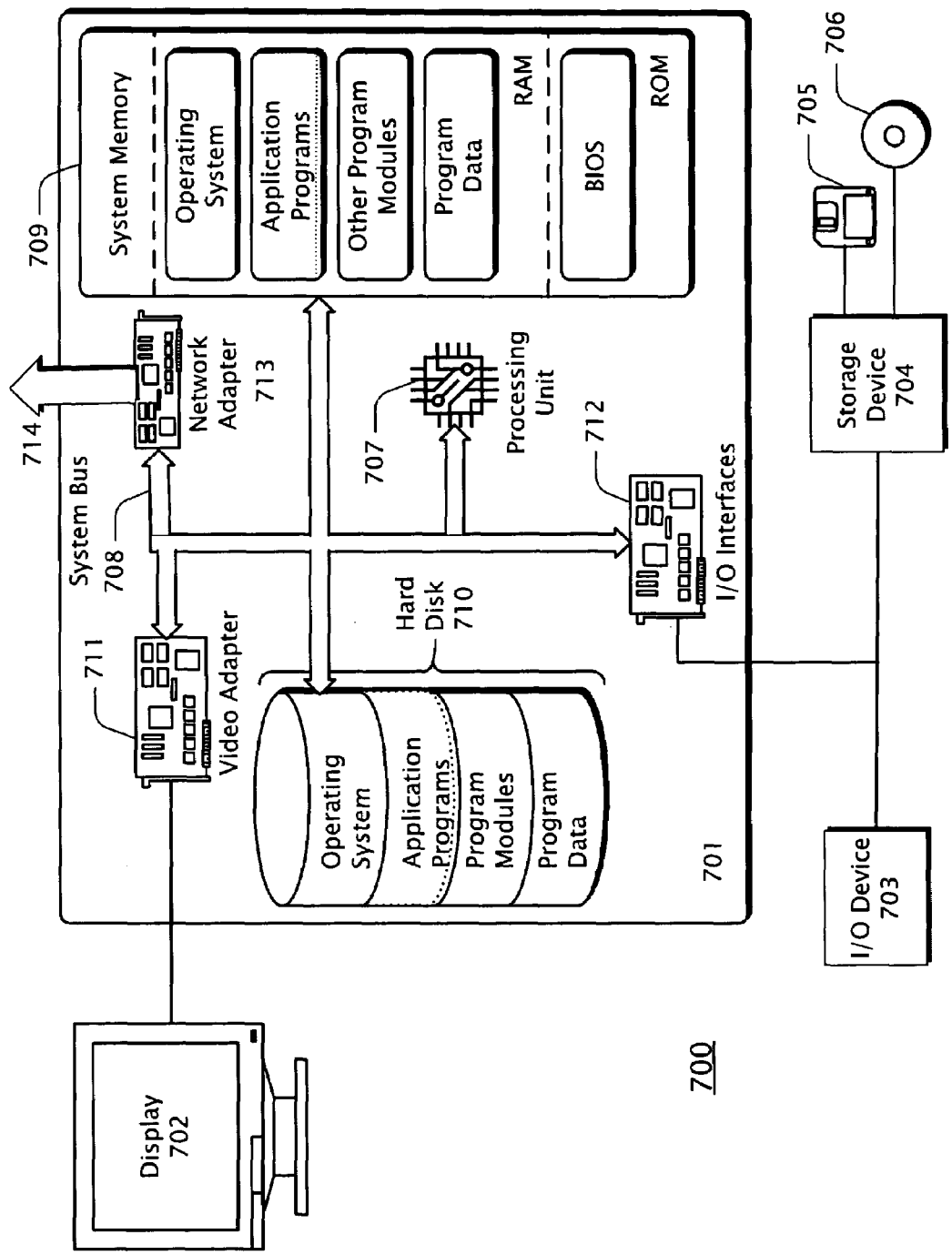
FIG. 35 is a block diagram showing an example computing environment in which the technologies, processes, systems and methods described above may be implemented.

FIG. 35 is a block diagram showing an example computing environment 3500 in which the technologies, processes, systems and methods described above may be implemented. A suitable computing environment may be implemented with numerous general purpose or special purpose systems. Examples of well known systems may include, but are not limited to, personal computers ("PC"), hand-held or laptop devices, microprocessor-based systems, multiprocessor systems, servers, workstations, consumer electronic devices, set-top boxes, and the like.

Computing environment 3500 generally includes a general-purpose computing system in the form of a computing device 3501 coupled to various peripheral devices 3502, 3503, 3504 and the like. System 3500 may couple to various input devices 3503, including keyboards and pointing devices, such as a mouse or trackball, via one or more I/O interfaces 3512. The components of computing device 3501 may include one or more processors (including central processing units ("CPU"), graphics processing units ("GPU"), microprocessors ("uP"), and the like) 3507, system memory 3509, and a system bus 3508 that typically couples the various components. Processor 3507 typically processes or executes various computer-executable instructions to control the operation of computing device 3501 and to communicate with other electronic and/or computing devices, systems or environment (not shown) via various communications connections such as a network connection 3514 or the like. System bus 3508 represents any number of several types of bus structures, including a memory bus or memory controller, a peripheral bus, a serial bus, an accelerated graphics port, a processor or local bus using any of a variety of bus architectures, and the like.

System memory 3509 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 3509 typically stores data, computer-executable instructions and/or program modules comprising computer-executable instructions that are immediately accessible to and/or presently operated on by one or more of the processors 3507.

Mass storage devices 3504 and 3510 may be coupled to computing device 3501 or incorporated into computing device 3501 via coupling to the system bus. Such mass storage devices 3504 and 3510 may include a magnetic disk drive which reads from and/or writes to a removable, non-volatile magnetic disk (e.g., a "floppy disk") 3505, and/or an optical disk drive that reads from and/or writes to a non-volatile optical disk such as a CD ROM, DVD ROM 3506. Alternatively, a mass storage device, such as hard disk 3510, may include non-removable storage medium. Other mass storage devices may include memory cards, memory sticks, tape storage devices, and the like.

Any number of computer programs, files, data structures, and the like may be stored on the hard disk 3510, other storage devices 3504, 3505, 3506 and system memory 3509 (typically limited by available space) including, by way of example, operating systems, application programs, data files, directory structures, and computer-executable instructions.

Output devices, such as display device 3502, may be coupled to the computing device 3501 via an interface, such as a video adapter 3511. Other types of output devices may include printers, audio outputs, tactile devices or other sensory output mechanisms, or the like. Output devices may enable computing device 3501 to interact with human operators or other machines or systems. A user may interface with computing environment 3500 via any number of different input devices 3503 such as a keyboard, mouse, joystick, game pad, data port, and the like. These and other input devices may be coupled to processor 3507 via input/output interfaces 3512 which may be coupled to system bus 3508, and may be coupled by other interfaces and bus structures, such as a parallel port, game port, universal serial bus ("USB"), fire wire, infrared port, and the like.

Computing device 3501 may operate in a networked environment via communications connections to one or more remote computing devices through one or more local area networks ("LAN"), wide area networks ("WAN"), storage area networks ("SAN"), the Internet, radio links, optical links and the like. Computing device 3501 may be coupled to a network via network adapter 3513 or the like, or, alternatively, via a modem, digital subscriber line ("DSL") link, integrated services digital network ("ISDN") link, Internet link, wireless link, or the like.

Communications connection 3514, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code or data maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, communications media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A backup method comprising:
   calculating a set of new file record hashes;
   creating a list of potentially changed clusters based at least in part on comparing the set of new file record hashes to a set of previous file record hashes;
   calculating a set of current cluster hashes wherein each one of the set of current cluster hashes is calculated based on a corresponding one of a plurality of clusters of one or more storage devices, and wherein each one of the set of current cluster hashes uniquely identifies the corresponding one of the plurality of clusters, and wherein the calculating the set of current cluster hashes is based at least in part on the list of potentially changed clusters;
   reducing the set of current cluster hashes to include only those not already stored in a backup database, resulting is a reduced set of cluster hashes; and
   storing in the backup database a set of clusters of the plurality of clusters identified by the reduced set of cluster hashes wherein each cluster stored in the backup database is unique resulting in single-instance storage in the backup database.

2. The backup method of claim 1 further comprising:
   building an exclusion list;
   modifying the set of file record hashes based on the exclusion list, resulting in a modified set of file record hashes; and
   storing the modified set of file record hashes as a new previous set of file record hashes.

3. The backup method of claim 1 further comprising:
   building a current in-use cluster list;
   excluding any clusters marked as not-in-use from the current in-use cluster list;
   modifying the current in-use cluster list based on a fix-up list, resulting in a modified current in-use cluster list; and
   calculating the set of current cluster hashes based at least in part on the modified current in-use cluster list.

4. The method of claim 1 further comprising establishing a backup protocol session between a client and a backup server.

5. The backup method of claim 1 embodied in computer-executable instructions on computer-storage media.

6. The backup method of claim 1 wherein the storing in the backup database includes a recoverable commit operation.

7. The backup method of claim 1 further comprising sorting the set of current cluster hashes.

8. The backup method of claim 7 wherein the sorting is performed by a virtual memory and cache-aware sort.

9. The method of claim 1 wherein the plurality of clusters are included on a single client.

10. The method of claim 1 wherein the plurality of clusters are included on a plurality of clients.

11. The method of claim 1 further comprising storing the reduced set of cluster hashes in the backup database.

12. The method of claim 1 wherein the calculating is performed using a hashing function that calculates a fixed-sized hash value from an arbitrarily-long input value, and wherein the input value is cluster data.

* * * * *